US012690949B2

(12) United States Patent
Demirel

(10) Patent No.: US 12,690,949 B2
(45) Date of Patent: Jul. 28, 2026

(54) ORTHODONTIC DEVICE

(71) Applicant: Ali Arslan Nazan, Istanbul (TR)

(72) Inventor: Esra Demirel, Istanbul (TR)

(73) Assignee: Ali Arslan Nazan, Istanbul (TR)

( * ) Notice: Subject to any disclaimer, the term of this patent is extended or adjusted under 35 U.S.C. 154(b) by 48 days.

(21) Appl. No.: 18/879,813

(22) PCT Filed: Jul. 4, 2023

(86) PCT No.: PCT/TR2023/050637
§ 371 (c)(1),
(2) Date: Dec. 30, 2024

(87) PCT Pub. No.: WO2024/010554
PCT Pub. Date: Jan. 11, 2024

(65) Prior Publication Data
US 2025/0161001 A1 May 22, 2025

(30) Foreign Application Priority Data

Jul. 5, 2022 (TR) ................................ 2022/011096

(51) Int. Cl.
*A61C 7/08* (2006.01)
*A61C 5/00* (2017.01)
(52) U.S. Cl.
CPC ................ *A61C 7/08* (2013.01); *A61C 5/007* (2013.01)
(58) Field of Classification Search
CPC ................................... A61C 7/08; A61C 5/007
See application file for complete search history.

(56) References Cited

U.S. PATENT DOCUMENTS

2004/0206932 A1* 10/2004 Abuelyaman ............ A61K 6/30
252/79.1
2005/0181332 A1* 8/2005 Sernetz .................. A61C 5/007
433/180
2015/0072299 A1 3/2015 Alauddin et al.
(Continued)

FOREIGN PATENT DOCUMENTS

CZ 2017809 A3 4/2019
EP 0841877 B1 10/1999
(Continued)

OTHER PUBLICATIONS

Tran et al. Understanding the wetting properties of nanostructured selenium coatings: the role of nanostructured surface roughness and air-pocket formation. Int J of Nanomedicine, May 17, 2013;8:2001-9. [retrieved Mar. 14, 2025] Retrieved from: <URL: https://pmc.ncbi.nlm.nih.gov/articles/PMC3669097/> (Year: 2013).*
(Continued)

*Primary Examiner* — Eric J Rosen
*Assistant Examiner* — Courtney N Huynh
(74) *Attorney, Agent, or Firm* — Bayramoglu Law Offices LLC

(57) ABSTRACT

An orthodontic retainer for stabilization of plurality of teeth is provided, which includes at least one first textured group of layer(s) for improving adhesiveness which contacts inner surfaces of teeth, at least one second textured group of layer(s) for preventing biofilm entities which is positioned at interdental places of teeth, wherein the orthodontic retainer is formed in one piece.

17 Claims, 13 Drawing Sheets

(56)            References Cited

U.S. PATENT DOCUMENTS

| | | | |
|---|---|---|---|
| 2016/0058527 A1* | 3/2016 | Schumacher | A61C 7/08 |
| | | | 433/24 |
| 2019/0090985 A1* | 3/2019 | Jo | A61C 7/002 |
| 2019/0282336 A1 | 9/2019 | Benarouch et al. | |
| 2021/0267723 A1* | 9/2021 | Sandwick | A61C 13/26 |
| 2022/0054228 A1 | 2/2022 | Gauggel | |
| 2024/0099815 A1* | 3/2024 | Connell | B08B 17/065 |

FOREIGN PATENT DOCUMENTS

| | | | | |
|---|---|---|---|---|
| EP | 1539021 B1 | 7/2008 | | |
| EP | 3162320 A2 * | 5/2017 | | A61C 7/16 |
| KR | 20190143049 A * | 12/2019 | | A61C 8/0096 |
| WO | 2020211746 A1 | 10/2020 | | |

OTHER PUBLICATIONS

Deng et al. Biofilm Formation and Contact Angles on Dental Restorative Biomaterials. Decisions in Dentistry, Sep. 12, 2019 [ retrieved on Mar. 14, 2025]. Retrieved from the Internet: <URL:https://decisionsindentistry.com/article/biofilm-formation-dental-restorative-biomaterials/> (Year: 2019).*

Hydrophilic Titanium Coatings, [online]. Aculon, Jul. 25, 2021, 2 pages. [retrieved on Mar. 14, 2025]. Retrieved from the Internet Archive: <URL: https://web.archive.org/web/20210725113435/https://www.aculon.com/hydrophilic-titanium/> (Year: 2021).*

Rimondini et al. The Effect of Surface Roughness on Early In Vivo Plaque Colonization on Titanium. Journal of Periodontology, 68: 556-562 (1997) [online], [retrieved on Mar. 19, 2025] Retrieved from the Internet: <URL:https://aap.onlinelibrary.wiley.com/doi/epdf/10.1902/jop.1997.68.6.556>. (Year: 1997).*

Soyama et al. The use of various peening methods ot improve the fatigue strength of titanium alloy Ti6Al4V manufactured by electron beam melting. AIMS Materials Science, 5(5): 1000-1015 (Oct. 29, 2018), [retrieved Mar. 19, 2025]. Retrieved from the Internet. (Year: 2018).*

KR20190143049A (Park Mi Ra ) Mouthpiece, Dec. 30, 2019 [retrieved on Mar. 12, 2025]. Translation retrieved from: Espacenet (Year: 2019).*

ISO 4287/1-1984, Surface roughness—Terminology—Part 1: Surface and its parameters, British Standards Institution, 1984, pp. 1-18.

ISO 4287, Geometrical Product Specifications (GPS)—Surface texture: Profile method—Terms, definitions and surface texture parameters, International Standard, 1997, pp. 1-25.

ISO 25178-1, Geometrical product specifications (GPS)—Surface texture: Areal—Part 1: Indication of surface texture, International Standard, 2016, pp. 1-25.

ISO 25178-701, Geometrical product specifications (GPS)—Surface texture: Areal—Part 701: Calibration and measurement standards for contact (stylus) instruments, International Standard, 2010, pp. 1-25.

ISO 19403-1, Paints and varnishes—Wettability—Part 1: Terminology and general principles, International Standard, 2017, pp. 1-9.

ISO 19403-2, Paints and varnishes—Wettability—Part 2: Determination of the surface free energy of solid surfaces by measuring the contact angle, International Standard, 2017, pp. 1-14.

* cited by examiner

FG. 10F

11

111h

132

130

133

132

131

133

ORTHODONTIC DEVICE

CROSS REFERENCE TO THE RELATED APPLICATIONS

This application is the national phase entry of International Application No. PCT/TR2023/050637, filed on Jul. 4, 2023, which is based upon and claims priority to Turkish Patent Application No. 2022/011096, filed on Jul. 5, 2022, the entire contents of which are incorporated herein by reference.

TECHNICAL FIELD

The present invention relates to an improved orthodontic device and a production method thereof in the form of a lingual retainer for securing position of teeth in post-treatment term of an orthodontic treatment.

BACKGROUND

Orthodontic retainers are well known with their use in the post-treatment procedure of correcting misalignment of teeth. A retainer is generally provided with circular cross section and is configured to stabilize plurality of teeth for a period of time so that the teeth brought into allignment would not lose their initial positions. Retention period is generally longer than 1 year, and in some orthodontic cases, it can even be more than 5 years. The most common problem with the conventional retainers is debonding which means that the retainer glued to a number of teeth are disintegrated from composite resin or is damaged with the effect and pressure of chewing and other mechanical forces exerted on the retainer.

There are different types of implementations for the configuration and formation of retainers in prior art. Twisted stainless steel made retainer, glass fiber made retainer, nickel and nickel alloy made retainer, titanium and titanium alloy made retainer and gold plated stainless steel made retainer are some examples of the conventional retainers. Majority of these products are bended by hand work in order to conform with teeth morphology of the patient either in upper or lower jaw. Twisted stainless steel is the most popular between all these materials, as the most economical one. Mechanical behaviour of twisted stainless steel is very close to the nitinol material. Likewise, nickel-titanium alloys (i.e. nitinol) or shape memory alloys are popular materials as they enable bending with hand work by heat treatment.

One such retainer configured to stabilize a plurality of teeth in a jaw is disclosed in US20220054228 A1 which includes sections with trapezoid retentions and notches that run transversal to the longitudinal direction. These sections are basically provided for improving adherence to teeth surfaces by adhesive and thus aiming to increase endurance of the retainer. However, it's not economical to manufacture such a type, especially with CNC machining, laser or wire erosion approaches. Additionally, cutting from a plate such trapezoid sections (like saw blade) will provide a lot of burrs and cleaning-post processing workflow of such a retainer model is time consuming.

A similar retainer device configured for stabilizing teeth is disclosed in US2016058527 A1 wherein a machined surface of the retainer faces the tooth surface in the installed condition of the retainer, and wherein an upper side or a lower side of the retainer corresponds to an original surface plane of the sheet metal plate. In other words, retainer is cut from a metal sheet by a machining tool or by a laser cutting.

Another beneficial point of such a model is using nitinol material. Using nitinol material appears to be advantageous for the purpose of producing orthodontic retainers due to mechanical properties and resistance against break off. However there are many studies in the literature which show that, there is no statistical difference between usage of such a nitinol retainer comparing with twisted stainless steel retainer, especially on failure (debonding) rates.

US2019090985 A1 discloses a different type of retainer wherein the retainer is formed from a thermoplastic synthetic material that is processible by a 3D printing method. Embodiments of the retainer disclosed in this document require increased surface area and therefore oral hygiene problems arise due to the large surface area and increased complexity.

EP1539021 B1 discloses a further type of retainer having roughened surface elements at each of its two ends. The retainer is produced from titanium or a titanium alloy as one piece. However, said retainer is made for mass production and is not suitable for customization according to teeth morphology and interdental places of the teeth, also advanced surface technologies or approaches have not been implemented in order to prevent debonding problem or biofilm entities, and thus it has never been widely commercialized.

US 2019/282336 A1 discloses an orthodontic appliance comprising a one-piece shape memory band the cross section of which can vary according to the longitudinal position of said cross section, and comprising a bonding zone configured so as to exhibit a shape substantially identical to that of a tooth. However, said prior art solve some problem according to positioning of the orthodontic appliance, not preventing biofilm entities on the teeth.

Another prior art document WO 2020/211746 A1 discloses micro-/nano-structured anti-biofilm surfaces, methods of making anti-biofilm surfaces, methods of reducing bacterial and fungal growth, and dental appliances having micro-/nano-structured anti-biofilm surfaces. However, it does not express how to generate these surfaces directly on an orthodontic retainer.

CZ 2 017 809 A3 discloses two-part dental intraosseous implant and method of preparation, however, does not disclose any implementation to an orthodontic retainer.

Another prior art document US 2015/072299 A1 discloses an orthodontic appliance comprises a portion made of a shape memory alloy having a base alloy composition of at least two metallic elements and a treated region having an alloy composition that is depleted in at least one of the metallic elements of the base alloy composition. Again, this disclosure does not teach any implementation in order to prevent debonding problem or biofilm entities.

Unfortunately, the retainers described have a number of disadvantages. One of the problems associated with the prior art is that retainers suffer debonding or damaging and corrosion or biofilm problems in long term usage due to the randomly and not selectively roughened surfaces. The most weak point of existing retainers is to have the same surface roughness parameters for all areas of the product which make contact with teeth and on interdental places which remain without adhesive. On the other hand, randomly and not selectively roughened surfaces provided thereon for the sake of better adherence do not provide sufficient endurance in long term. Such a retainer does not provide good adhesiveness and corrosion resistance at once and the same time, due to above-mentioned fixed surface parameters.

The object of the present invention is to provide an orthodontic retainer having superior adhesiveness properties for improving bonding forces, minimizing debonding or damaging and preventing biofilm entities and corrosion.

SUMMARY

The present invention provides a one piece orthodontic retainer in lingual retainer shape configured for stabilization of plurality of teeth in lingual side comprising at least one first textured group of layer for improving adhesiveness and preventing debonding problems, and at least one second textured group of layer for improving corrosion resistance and inhibiting biofilm formation.

Said first textured group of layers and said second textured group of layers have surface roughness profiles as defined by specific parameters hereinbelow. This has been achieved through a specific surface roughness profile as defined in ISO 4287 standards regarding surface texture parameters. Additionally, determination of the parameters for contact angle, measuring contact angle and measuring surface roughness are defined in ISO 25178.

The present invention provides quite distinct surface patterns on micron or nanometer scale. Specially made numeric dimples or notches or protrusions may be generated and placed with different types of depth and width. They may be continuous or discontinuous with various shape and geometries and may be formed with 2d or 3d micro-constructions. It's possible to observe those microns scale structures by using a magnifying glass. However, it's impossible to have a look and understand nanometer scale microstructures by the naked eye or by using such a simple magnifying glass and therefore they need to be determined just by using electron microscope. Scope of such a micron or nanometer scale textured surfaces may be regular, near-regular or irregular. Construction of the surfaces can be designed on computer environment according to the desired surface characteristics. Said first textured group of layer(s) and second textured group of layer(s) are specially made and designed with geometrical entities (peaks and valleys) in order to reach out desired surface behaviours. First textured group of layer(s) can be hydrophilic or superhydrophilic or oleophilic or superoleophilic. Second textured group of layer(s) can be hydrophobic or ultrahydrophobic or superhydrophobic or oleophobic or superoleophobic.

Hydrophilic surface shows, low contact angle, good adhesiveness, good wettability and high solid surface free energy. Hydrophobic and hydrophilic or oleophobic and oleophilic based surfaces are popular in engineering field, and presently it's possible to find coating materials for this purpose. Hydrophobic surface shows high contact angle, poor adhesiveness, poor wettability, low solid surface free energy, and mostly expressed with "lotus effect". Combined effects of roughness and hydrophobicity results in self-cleaning surfaces. Nature has the best example such as a lotus leaf. A droplet takes up the particles loosely covering the leave while rolling off, thus cleaning the surface. In many cases, the superhydrophobicity characteristic enables plants to reduce water loss, and reduce the adhesion of pathogens.

Oleophilic means "oil-loving." Oleophilic surfaces attract oils, or organic fluids, and allows it to level out or wet out. Most surfaces are oleophilic relative to the oily liquid, because of its low surface tension tends to spread out.

An oleophobic surface is a surface that is more wettable to water than to oil. Oleophobicity, let alone superolephobicity, is much harder to achieve than superhydrophobicity. In oil, the forces between oil molecules are weak van der Waals forces. Due to this, oil molecules are not as strongly bound to each other as in water, and the surface tension of oil is much lower. Such a low surface free energy requires a special engineering of the surface properties, in terms of both chemistry and roughness.

As used herein and in the art, the expressions "hydrophobic", "hydrophobicity" and grammatical diversions thereof, refer to a property reflected by water repellency. The degree of hydrophobicity or hydrophilicity is typically and acceptably determined by contact angle measurements of water or aqueous solutions, or of amphiphilic liquid substances (e.g., glycerol and alkylene glycols).

As used herein and in the art, the expressions "oleophobic", "oleophobicity" and grammatical diversions thereof, refer to a property reflected by oil repellency. The degree of oleophobicity or oleopholicity is typically and acceptably determined by contact angle measurements of non-aqueous liquids, including amphiphilic liquid substances (e.g., glycerol and alkylene glycols), hydrophobic liquid substances (e.g., organic substances such as long-chain alkanes, cycloalkyls, aryls, and the like) and oily substances (e.g., natural and synthetic oils such as, for example, olive oil), Roughness is a direct indicator of the surface topography. It is not a direct measure of surface chemistry. Changing the relative degree of one component to another in the surface layer will change the apparent overall surface energy. The surface energy is determined using the contact angle measurement. Therefore, the micro/nano scale constructions and surface roughness influence behavior of the surface.

Laser texturing is an environmentally friendly technique, moreover, it can process nearly all types of materials. It has been used to change the surface texture of metals to meet a specific functional requirement, such as desired surface behaviour. During laser processing, different environment is also can be use, including air, $CO_2$, $O_2$, $N_2$, Ar, water. An additional post-treatment can be use in order to change surface behaviour; like low heat treatment, acid etching, acid base treatment, electro anodizing, electropolishing, UV treatment, UV curable coatings, nanoimprint lithography, reverse imprint lithography, conventional lithography, photolithography etc for creating a hydrophilic, oleophilic, hydrophobic or superhydrophobic characteristic.

Surface energy modification plays an important role in attaining superhydrophobicity. After laser texturing with suitable pattern, the surface have oxide layer which is hydrophilic or oleophilic in nature and when the surface is exposed to ambient air or undergo low temperature heat treatment it will absorb airborne organic constituents or decomposition of $CO_2$ or treated chemically with low surface energy functional group such as alkyl or fluorosilane or modified fluoroalkylsilane which promotes to achieve superhydrophobic behavior. Likewise, after laser texturing the surface have oxide layer which is hydrophilic or oleophilic in nature (can be left hydrophilic or oleophilic) and the surface additionally can undergo chemical treatment or acid base treatment or heat treatment in order to get superhydrophilic or superoleophilic characteristic. Alternatively, the superhydrophobic or hydrophobic surface can be attained by roughening the surface or chemical modification or by both. Micro-/nanostructures on the superhydrophobic or hydrophobic surface are highly susceptible to mechanical wear, while surface compositions may also be altered by above mentioned methods. Likewise, altering the surface behaviour is possible by applying fluorinated hydrocarbon onto the surface (for example perfluorotetracosane) in order to get oleophobic or superoleophobic characteristic.

Preferably, the present invention advantageously involves using of a laser texturing for creating both the first textured group of layer(s) and the second textured group of layer(s)

by using computer aided design program with laser texturing method. Manufacturing and workflow of such a retainer is economical and fastest way to produce it. Such a texturing comprising single scale texturing method and/or dual scale texturing method and above mentioned post-treatment methods. Dual scale texturing method can be advantageous when the surface needed to has a hierarchical construction (microstructures and nanostructures together).

Alternatively, said first textured group of layer(s) and said second textured group of layer(s) can also be generated separately, respectively by mechanical wear and anodizing without using laser texturing. These mentioned methods, should be done to the focussed area by covering with mask of all the rest of the surfaces. For example, the first textured group of layer(s) can be textured with laser and then, can be covered with mask to these areas, and finally anodizing method or any above mentioned methods can be applied in order to be created of the second textured group of layer(s). Such a masking method can be used to cover and protect accomplished surfaces and their characteristics for next planned post-treatment operations. Also, instead of laser texturing, it is possible to use micro or nano scale laser melting or micro or nano scale 3d printing approaches in order to generate such characteristics of a second textured group of layer(s) or of a first textured group of layer(s). Finally, first textured group of layer(s) or second textured group of layer(s) can be textured with same texturing parameters, after that above mentioned surface altering methods can be applied in order to reach out desired surface behaviour.

Separating the effects of roughness and chemistry from contact angle measurements can be a complex problem both in principle and in practice. Translating the analysis of contact angles to a framework of surface energy only adds to the complexity, and that's why the present invention focuses on exhibiting surface properties basically on roughness and contact angle measurements.

The orthodontic retainer according to the present invention has first textured group of layer(s) comprising regularly repeating dimples or notches or protrusions forming a texture. Preferably, the first textured group of layer(s) comprises regularly repeating geometric structures having a contact angle ($\alpha$) with respect to the longitudinal direction (x) of the retainer, and wherein the contact angle is defined as $10° < \alpha < 90°$ (Hydrophilic) or as $0° < \alpha < 10°$ (Superhydrophilic). The first textured group of layer(s) can be considered oleophilic when it exhibits a contact angle of maximum 89° with a hydrophobic or oily liquid. In some aspects, first textured group of layer(s) can be considered oleophilic when it exhibits a contact angle of at least 11° with a hydrophobic or oily liquid, or a contact angle that ranges from 11° to 89° with a hydrophobic or oily liquid. Typically, first textured group of layer(s) can be considered superoleophilic when it exhibits a contact angle less than 10° with a hydrophobic or oily liquid. Main purpose of using this approach is to increase adhesiveness and resolve debonding or damaging problems in long term usage.

The orthodontic retainer according to the present invention has second textured group of layer(s) which predominantly coincide with interdental areas. Preferably, the second textured group of layer(s) comprises regularly repeating geometric structures having a contact angle ($\alpha$) with respect to the longitudinal direction (x) of the retainer, and wherein the contact angle is defined as $90° < \alpha < 120°$ (Hydrophobic) or as $120° < \alpha < 150°$ (Ultrahydrophobic) or as $\alpha > 150°$ (Superhydrophobic). The second textured group of layer(s) is considered oleophobic when it exhibits a contact angle higher than 90° with a hydrophobic or oily liquid, or a contact angle that ranges from 90° to 150° with a hydrophobic or oily liquid. Typically, a surface is considered superoleophobic when it exhibits a contact angle higher than 150° with a hydrophobic or oily liquid. Main purpose of using this approach is to combine effects of roughness and hydrophobicity or oleophobicity in self-cleaning surfaces. In this way, second textured group of layer(s) which are placed on interdental places, will prevent biofilm entities, ensure self-cleaning and provide corrosion resistance.

The first textured group of layer(s) (11) may advantageously be arranged on an upper (Y) and/or lower (Y') surface extending parallel to longitudinal direction (x) of the retainer and also perpendicular to lingual direction (z) of the retainer. In further embodiments, the retainer comprises first textured group of layer(s) and second textured group of layer(s) whereby they are separated from each other with different type of surface roughness parameters and different type of behaviours.

BRIEF DESCRIPTION OF THE DRAWINGS

FIGS. 10A-10F show possible alternatives and different embodiments of the first textured and second textured group of layer(s) provided on the retainer of the present invention.

Figure 1:
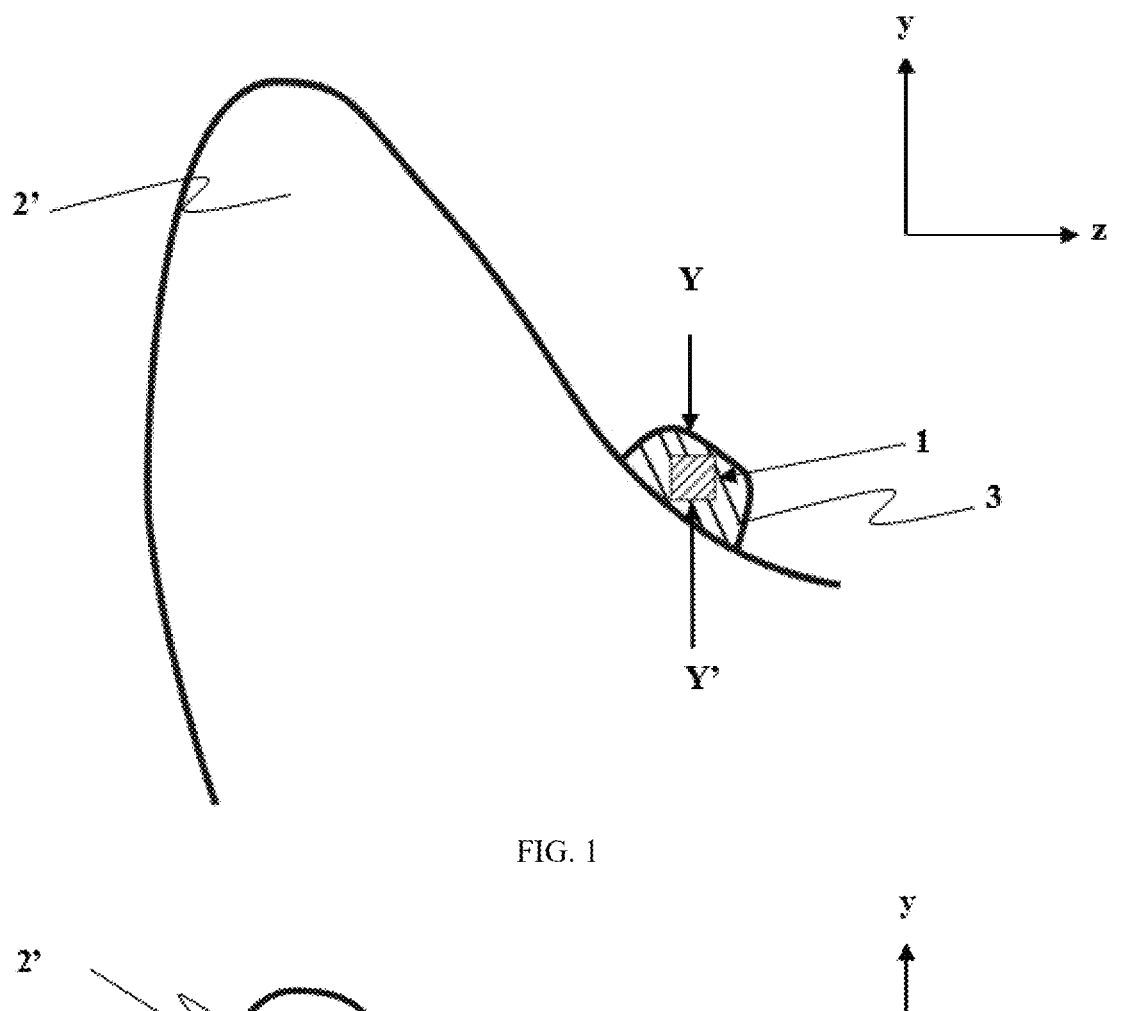
FIG. 1 shows cross-section of a tooth and the retainer according to the present invention which is attached on the tooth surface.

The elements in the figures are numbered individually and the correspondence of these numbers are given hereinafter.

1: Orthodontic retainer

1': Orthodontic retainer with multi texturing

1": Orthodontic retainer placement to the teeth

1*a*: Orthodontic retainer wherein the first and second textured layers are at the same height.

1*b*: Orthodontic retainer wherein the first textured layer is higher than the second textured layer

1*c*: Orthodontic retainer wherein the height of the first and second textured layers' are varied according to upper and lower jaw relation and bite relation of teeth.

1*d*: Orthodontic retainer wherein the second textured layer is higher than the first textured layer

1*e*: Orthodontic retainer wherein the height of the first and second textured layers' are varied according to stepped or irregular pattern adapted to more complex occlusal surfaces.

1*f*: Orthodontic retainer wherein the height of the first and second textured layers' are varied according to an asymmetrical variation addressing unique inter-arch relations.

1*g*: Orthodontic retainer wherein the height of the second textured layers' are vertically manipulated according to upper and lower jaw relation and bite relation of teeth.

2: Teeth

2': Tooth

21: Contact surfaces of teeth

22: Interdental places

3: Composite resin

11: First textured group of layer(s)

111': Peak side of first textured group of layer(s)

111": Valley side of first textured group of layer(s)

111*a*: A pattern of first textured group of layer(s) made with 5 microns scale

111*b*: A pattern of first textured group of layer(s) made with 50 microns scale

111*c*: A pattern of first textured group of layer(s) which can be made between 10-100 microns scale

111*d*: A pattern of continuous line of first textured group of layer(s) which can be made between 10-100 microns scale

111*e*: A pattern of triangular shape of first textured group of layer(s) which can be made between 10-100 microns scale

111*f*: A pattern of straight and parallel lines of first textured group of layer(s) which can be made between 10-100 microns

111*g*: The dimple or notch or protrusion of the first textured group of layer(s)

111*h*: The full length hole

12: Second textured group of layer(s)

121': Top level of second textured group of layer(s)— Peak Point

121": Bottom level of second textured group of layer(s)— Valley Point

121*a*: A pattern of second textured group of layer(s) which can be able to resist larger forces then 20 Kpa

121*d*: A pattern of second textured group of layer(s) which can be able to resist larger forces then 15 Kpa

121*e*: A pattern of second textured group of layer(s) which can be able to resist larger forces then 25 Kpa

121*g*: The dimple or notch or protrusion of the second textured group of layer(s)

130: Corner of the orthodontic retainer before post-treatment

131: Corner of the orthodontic retainer after post-treatment

132: Top side of the material which remains after laser cutting-Top Kerf

133: Bottom side of the material which remains after laser cutting-Bottom Kerf

200: Cutting line

201: Fixture holder-A part which used for fixation of the orthodontic retainer like holder, mainly used during and after texturing method, and made cut before transferring it to the patient $R_a$: Arithmetic average of profile height deviations from the mean line (Roughness Average)

$R_z$: Average maximum height of profile (Mean roughness depth)

α: Contact angle

X: Horizontal direction

Y: Top side

Y': Bottom side

Z: Tooth side

Z': Lingual direction-Tongue side

H8*b*: The height of material of first textured group of layer(s)

H9*b*: The height of material of second textured group of layer(s)

DETAILED DESCRIPTION OF THE EMBODIMENTS

An orthodontic retainer (1, 1', 1", 1*a*, 1*b*, 1*c*, 1*d*, 1*e*, 1*f*, 1*g*) for stabilization of plurality of teeth (2) comprising at least one first textured group of layer (11) for improving adhesiveness contacting with contact surfaces of teeth, at least one second textured group of layer (12) for placing on interdental places and configured to prevent biofilm entities, wherein the orthodontic retainer (1, 1', 1", 1*a*, 1*b*, 1*c*, 1*d*, 1*e*, 1*f*, 1*g*) is formed in one piece. The orthodontic retainer (1, 1', 1", 1*a*, 1*b*, *c*, 1*d*, 1*e*, 1*f*, 1*g*) of the present invention further comprises the first textured layer (11) and the second textured layer (12) having different type of surface roughness parameters from each other. The first textured layer (11) and the second textured layer (12) having different type of behaviours.

Figure 2:
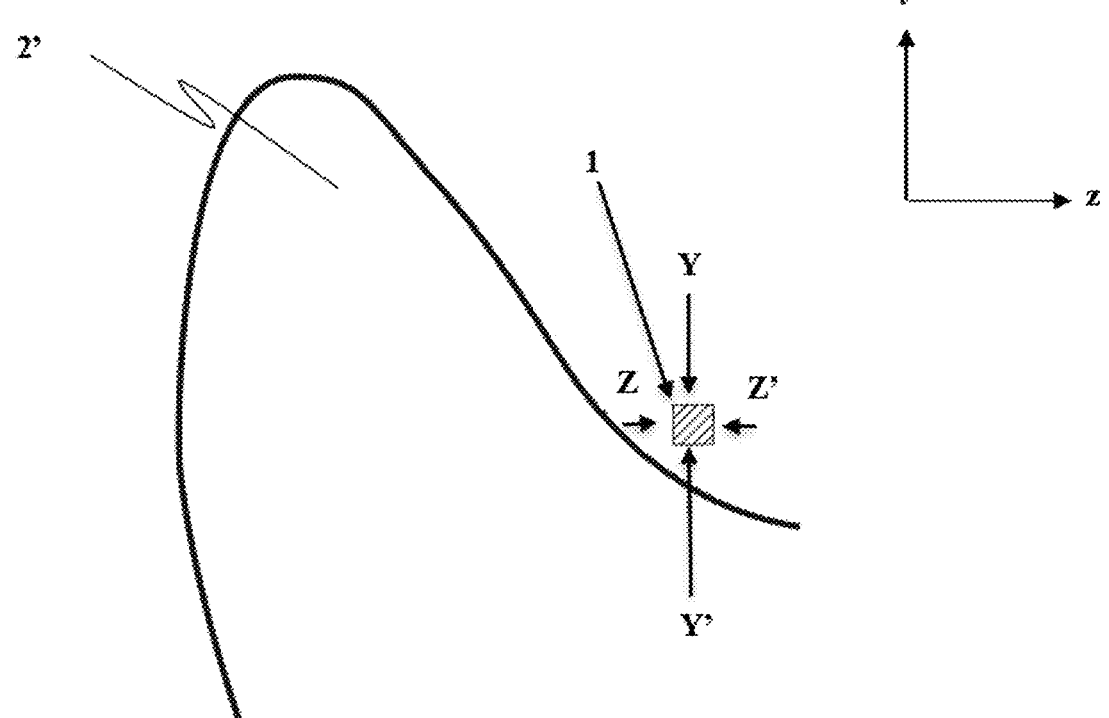
FIG. 2 shows cross-section of a tooth and the retainer according to the present invention which is fit with interdental places of the tooth surface and left without dental composit.
Figures 3, 4:
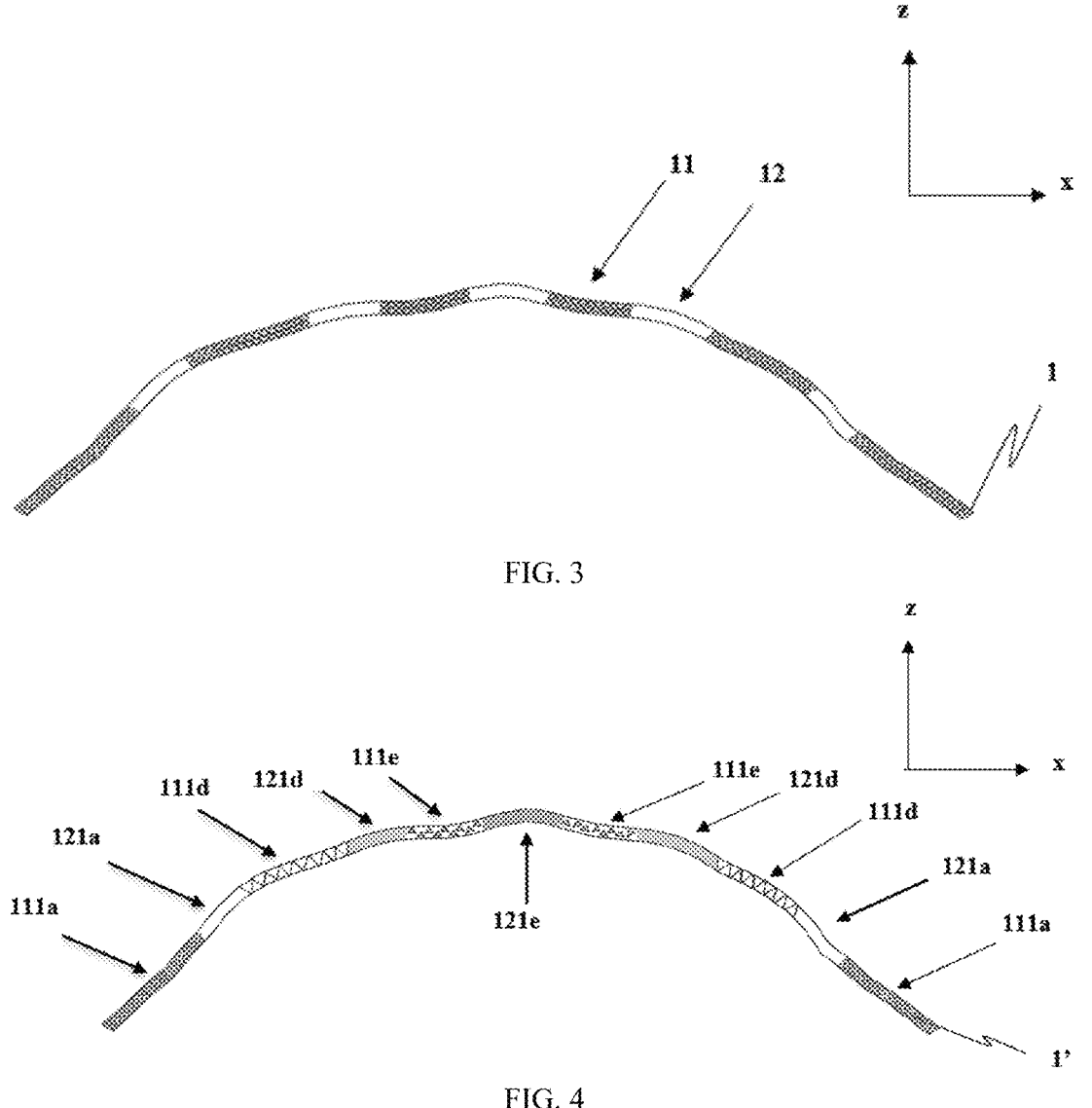
FIG. 3 is a representative global view of the retainer according to the present invention wherein the retainer is provided with first textured group of layer(s) and second textured group of layer(s).
FIG. 4 is an another alternative of representative global view of the retainer according to the present invention wherein the retainer is provided with first textured group of layer(s) and second textured group of layer(s) by multi texturing method.
Figures 5, 6:
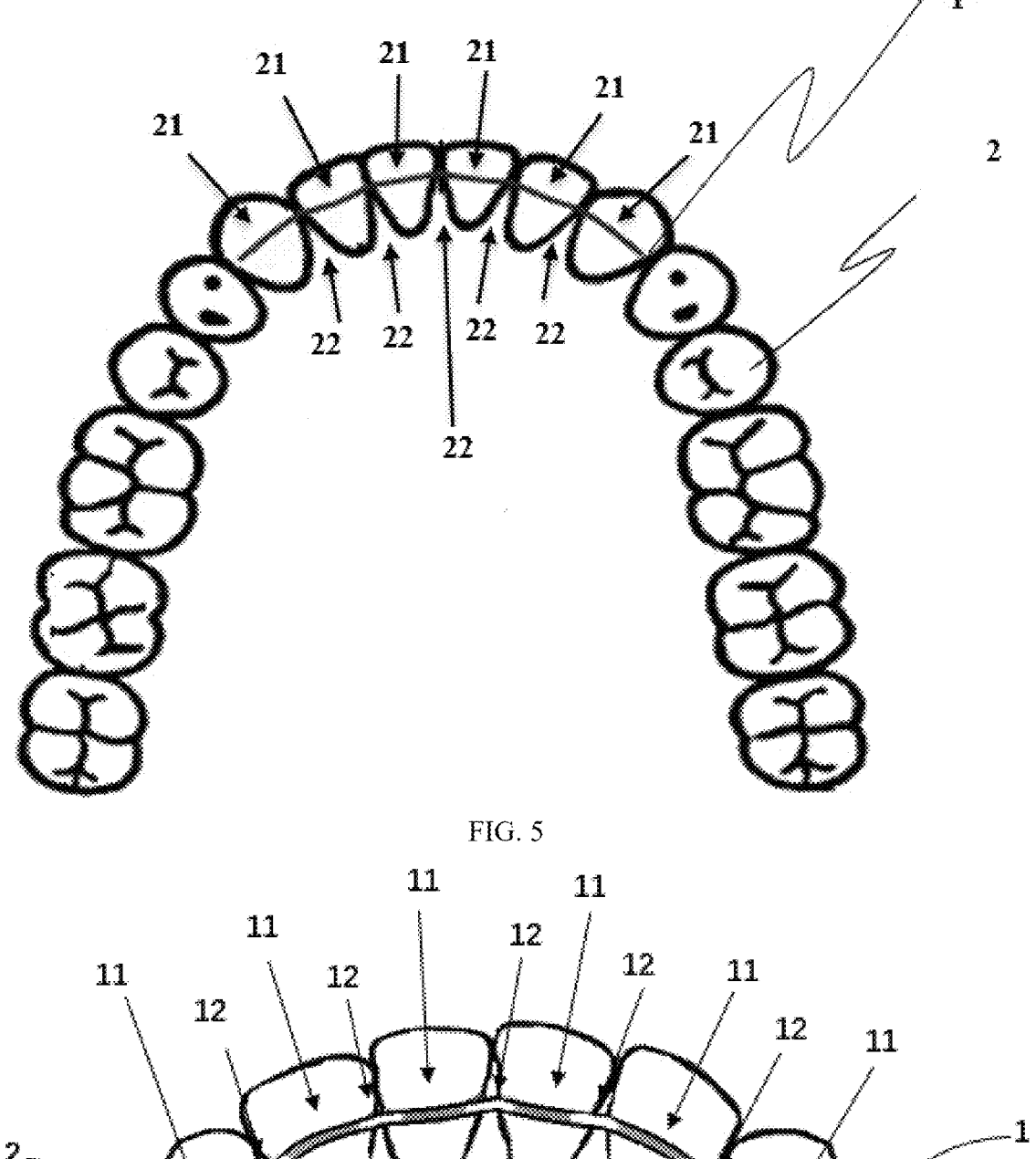
FIG. 5 illustrates the retainer according to the present invention whereby the retainer is bonded in lingual side of teeth in lower jaw of a patient.
FIG. 6 is a representative 3D view of the retainer as shown in FIG. 3 which is bonded to teeth of a patient.
Figure 7A:
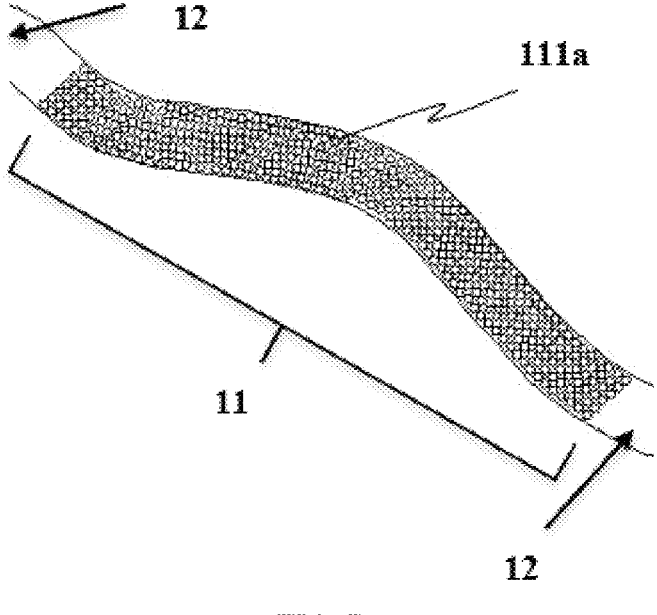
FIG. 7A shows an embodiment of the first textured group of layer(s) provided on the retainer of the present invention.
Figure 7B:
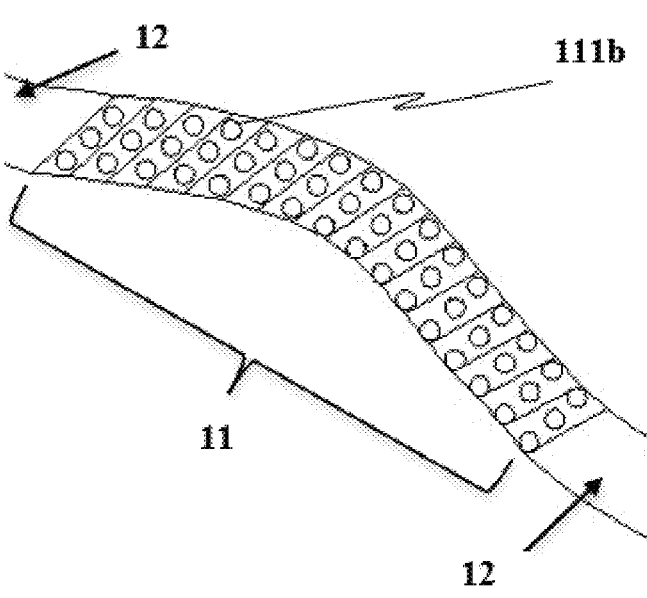
FIG. 7B shows a different embodiment of the first textured group of layer(s) with a circular shape provided on the retainer of the present invention.
Figure 7C:
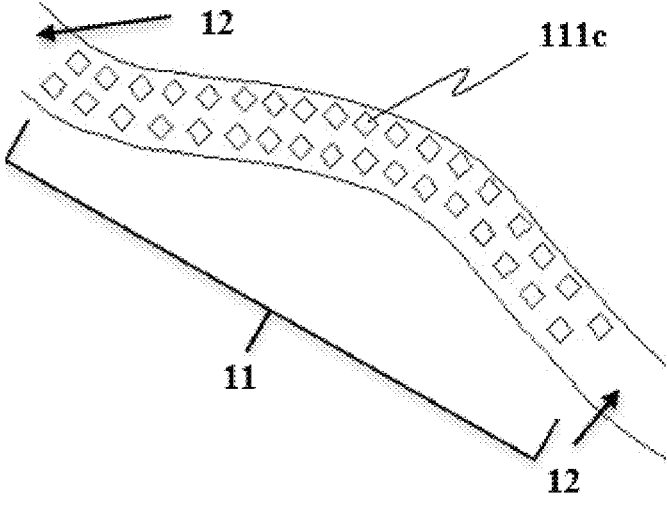
FIG. 7C shows a different embodiment of the first textured group of layer(s) with a rectangular shape provided on the retainer of the present invention.
Figure 7D:
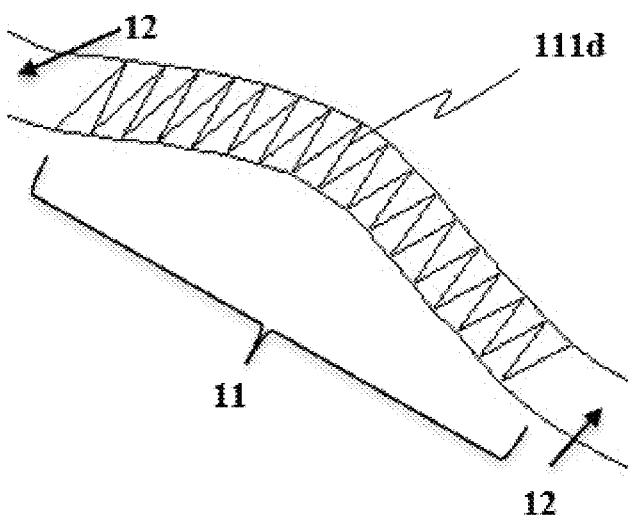
FIG. 7D shows a different embodiment of the first textured group of layer(s) with a zigzag shape provided on the retainer of the present invention.
Figure 7E:
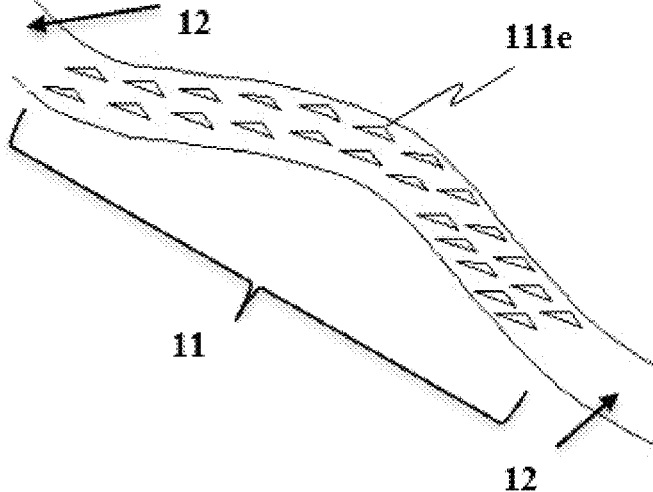
FIG. 7E shows a different embodiment of the first textured group of layer(s) with a triangular shape provided on the retainer of the present invention.
Figure 7F:
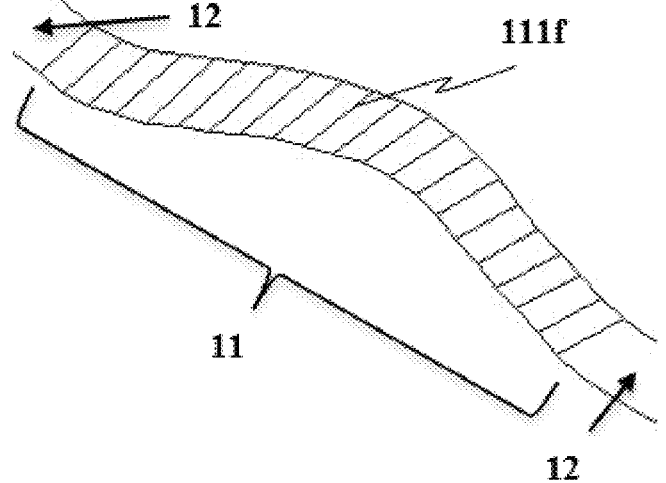
FIG. 7F shows a different embodiment of the first textured group of layer(s) with a transversally rectangular shape provided on the retainer of the present invention.

The first textured group of layer(s) (11) are brought into abutment with contact surfaces (21) of teeth (2) for the sake of increasing adhesiveness and resolve debonding problems. The first textured group of layer(s) (11) can be defined precisely in computer aided design program by using morphology of the contact surfaces (21) of teeth (2). Final application of the present invention includes applying of resin composits (3) (adhesive/glue) by orthodontist/dentist over first textured group of layer(s) (11) in order to fix the retainer (1, 1', 1", 1a, 1b, 1c, 1d, 1e, 1f, 1g) onto the teeth (2) as shown in FIG. 1. The second textured group of layer(s) (12) remain without composite resin which as shown in FIG. 2 and they can be defined precisely in a computer aided design program by using the interdental places (22) inbetween the teeth (2). In other words, interdental places (22) correspond to second textured group of layer(s) (12) of the retainer (1, 1', 1", 1a, 1b, 1c, 1d, 1e, 1f, 1g) and thereby these surfaces remain without bacterial contamination and stay in a self-cleaning manner. Such a 3d design of the retainer (1) is shown in FIG. 3 and placement of it to the teeth (2) is shown in FIG. 6.

Except that, teeth also have a mobility range due to which the teeth are movable in six degrees of freedom (6DOF-all directions) within an approximately 0.2 mm, during eating, sleeping and speaking. Especially during eating, chewing loads occur, and after the load is released, the teeth will want to return to their approximate initial positions.

Above dedicated movements are essential part of the orthodontic retainer and retaining manner of the "retainer treatment period". If the movement of the teeth will be blocked with such an unsuitable material, due this blocking of movements, teeth will not move but bone tissue and teeth's root will try to make active movements from joints and thus will occur mostly shortening of the teeth's root, and finally the result will be early losing of the teeth. (will probably live less than necessary). Such a mechanical allowance is possible only with super elastic or with shape memory alloy type materials. For example; ni-ti, beta titanium alloy etc.

At the other hand, gold is the best tissue friendly material and well known for decades in dentistry. The bacterial formation can be minimized and inhibited by using gold and gold alloy material. Such a gold consists alloy can be used for orthodontic retainer without trouble for long term purpose. Furthermore, the antibacterial efficacy of a silver alloy under conditions resembling build up of dry surface bacterial biofilms is successfully demonstrated according to US EPA test methods with a ≥99.9% reduction of test organisms over a 24 h period. Such a silver consists alloy can be used for the orthodontic retainer, especially for inhibiting bacteria formation in long term purpose.

The orthodontic retainer (1,1', 1", 1a, 1b, 1c, 1d, 1e, 1f, 1g) is made of shape memory alloy and/or superelastic alloy. The orthodontic retainer is made of nickel-titanium alloy or titanium alloy or beta titanium alloy or gold alloy or silver alloy.

The retainer (1) according to the present invention may suitably made of shape memory alloy of titanium alloy, and the present invention include, but are not limited to, iron, rhenium, molybdenum, calcium, chromium, cobalt, copper, gold, hafnium, indium, lead, magnesium, nickel, niobium, osmium, palladium, platinum, rare earth metals, silver, tantalum, technetium, titanium, tungsten, vanadium, yttrium, zinc, zirconium, and/or alloys of one or more of such metals (e.g., SS steel, MoRe alloy, CoCr alloy, TaW alloy, etc.).

The first textured group of layer(s) (11) comprises a hydrophilic or superhydrophilic or oleophilic or superoleophilic surface and the second textured layer (12) comprises a hydrophobic or ultrahydrophobic or superhydrophobic or oleophobic or superoleophobic surface.

The orthodontic retainer (1, 1', 1", 1a, 1b, 1c, 1d, 1e, 1f, 1g) comprising; at least one region having hydrophilic or superhydrophilic or oleophilic or superoleophilic surface (11, 111', 111", 111a, 111b, 111c, 111d, 111e, 111f) located on a top side (Y') and/or a bottom side (Y") of the orthodontic retainer (1) and/or located on a tooth side (Z') and/or on a tongue side (Z") of the orthodontic retainer (1), at least one region having hydrophobic or ultrahydrophobic or superhydrophobic or oleophobic or superoleophobic surface (12, 121', 121", 121a, 121d, 121e) located on a top side (Y) and/or a bottom side (Y') and/or located on a tooth side (Z') and/or on a tongue side (Z") of the orthodontic retainer (1), wherein the orthodontic retainer (1, 1', 1", 1a, 1b, 1c, 1d, 1e, 1f, 1g) is formed in one piece and consists of a shape memory type or superelastic type alloy. Shape memory alloy or superelastic alloy are able to prevents breaking of the orthodontic retainer and able to allow above mentioned 6DOF movements of the teeth.

Present invention involves both on top or on bottom side placement of the first textured group of layer(s), however, present invention advantageously prefer the placement of first textured group of layer(s) (11) just on one side, on the top side (Y) of the orthodontic retainer (1). For example, such a placement of the orthodontic retainer for lower jaw has given in FIG. 3. Main purpose of using this approach is minimizing the enamel loss, mostly in the case of debonding (failure) problems.

The first textured group of layer(s) (11) has a surface roughness profile formed by dimples, notches or protrusions, and said surface roughness profile is defined by an arithmetical mean roughness value ($R_a$) ranging from 12.5 to 35.0 μm, and a mean roughness depth value ($R_z$) ranging from 50.0 to 200 0 μm.

The second textured group of layer(s) (12) have a surface roughness profile as defined by: an arithmetical mean roughness value ($R_a$) ranging from 0.012 to 8 μm and a mean roughness depth value ($R_z$) ranging from 0.40 to 50 μm.

The first textured group of layer(s) (11) according to the present invention are hydrophilic or superhydrophilic or oleophilic or superoleophilic and have better adherence with glue so that the retainer (1) has sufficient endurance over time and resistance against shear forces upon chewing effect in lower and upper jaw. Roughness itself is a series of microscopic "peaks and valleys" across a surface. This becomes clearer when viewed in cross-section. This has been achieved through a specific surface roughness profile as determined by ISO standards (i.e. EN ISO 4287) regarding surface texture parameters. Parameters for contact angle, measuring contact angle and surface roughness measurement methods are defined in ISO 25178. Accordingly, the first textured group of layer(s) (11) according to the present invention are determined with the following parameters:

$R_a$=Arithmetic average of profile height deviations from the mean line (Roughness Average)

$R_z$=Average maximum height of profile (Mean roughness depth)

α=Contact Angle $R_a$ value as mentioned herein is relevant to the arithmetical mean of the absolute values of the profile deviations from the mean line of the roughness profile. $R_z$ is relevant with depth of the roughness. These values basically determine characteristics of the roughness, more specifically dimples or notches and/or protrusions. For instance, referring to FIG. 6, $R_a$ value determines average deviations with respect to the top surface level (H8b) of the first textured group of layer(s) (11). $R_z$, on the other hand, refers to average height of the dimples or notches or protrusions.

It has been noted the desired hydrophilic or superhydrophilic or oleophilic or superoleophilic nature and adherence properties of the first textured group of layer(s) (11) is obtained with the following ranges of parameters:

$R_a$=12.5-35.0 μm
$R_z$=50-200.0 μm
α=0°-90°

In preferred embodiments, the $R_a$ value as defined herein ranges from 15 to 30 μm and most preferably from 20 to 25 μm. Likewise, the $R_z$ value as defined herein preferably ranges from 70 to 160.0 μm, and most preferably from 90.00 to 130.0 μm. In the same way, the α value as defined herein is preferably less than 60 degrees and most preferably less then 10 degrees.

The second textured group of layer(s) (12) according to the present invention are hydrophobic or ultrahydrobic or superhydrophobic or oleophobic or superoleophobic and have less adhesiveness properties with composite resin so that the retainer (1) has lower wettability and prevent bacterial entities as well as biofilm formation, resistant against corrosion while having self-cleaning properties. The second textured group of layer(s) (12) according to the present invention are determined with the following parameters:

$R_a$=Arithmetic average of profile height deviations from the mean line (Roughness Average)
$R_z$=Average maximum height of profile (Mean roughness depth)
α=Contact Angle Likewise, these values basically determine characteristics of the roughness, more specifically dimples or notches and/or protrusions. For instance, referring to FIG. 6, $R_a$ value determines average deviations with respect to the top surface level (H9b) of the second textured group of layer(s) (12). $R_z$, on the other hand, refers to average height of the dimples or notches or protrusions.

It has been noted the desired hydrophobic or ultrahydrophobic or superhydrophobic or oleophobic or superoleophobic nature, and anti-bacterial and self-cleaning properties of the second textured group of layer(s) obtained with the following (12) are ranges of parameters:

$R_a$=0.012-8.0 μm
$R_z$=0.40-50.0 μm
α=90°-180°

In preferred embodiments, the $R_a$ value as defined herein ranges from 0.1 to 6.3 μm and most preferably from 0.2 to 3.2 μm. Likewise, the $R_z$ value as defined herein preferably ranges from 1 to 40.0 μm, and most preferably from 2.0 to 20.0 μm. In the same way, the α value as defined can be ranging from 90 to 120 degrees, or 150 to 180 degrees.

The the orthodontic retainer (11', 1", 1a, 1b, 1c, 1d, 1e, 1f, 1g) embeddable in a composite resin (3) and perpendicular distance between closest tooth surface and the closest orthodontic retainer surface on a tooth side (Z) is maximum 0.10 mm.

The interdental places (22) correspond to the second textured group of layer(s) (12) without composite resin and the perpendicular distance between closest tooth surface and the closest orthodontic retainer surface on a tooth side (Z) is between 0.10 mm-0.40 mm.

The orthodontic retainer (1, 1', 1", 1a, 1b, 1c, 1d, 1e, 1f, 1g) has a cross-sectional height (H8b, H9b) and, a cross-section in the shape of a quadrilateral, with edge lengths of the cross section amounting to max. 0.55 mm, and min. 0.35 mm. This tolerance range has been selected as a best wearing comfort range. Bigger than this range will occur discomfortability and less than this range will occur easy material breaking and fatigue. An "edge-shaped" (for example quadrilateral shape) configuration of the orthodontic retainer advantageously offers "incilination and angulation control", likewise, axial inclination and axial angulation of the teeth and their roots. An edge-shaped retainer can properly interlock with the bonding composite and thus prevents it from the respective rotational movement. On the other hand, traditional retainers have a round cross section, and due to lack of interlocking, cannot be obtained proper inclination and angulation control of teeth and their roots, during "retaining treatment period"

The retainer (1) according to the instant invention is produced as a one piece in wire shape, and is customized to teeth morphology of the patient. The ultimate shape of the retainer (1) can be obtained by cutting from a plate according to teeth morphology. Cross-section of the wire shaped retainer (1) can be quadrilateral or trapezoidal, with edge lengths of the cross section amounting to max. 0.55 mm, and min. 0.35 mm The dimples, notches or protrusions (111, 111', 111a, 111b, 111c, 111d, 111e, 111f) form a repeating texture having circular, rectangular, zigzag, triangular, transversally rectangular or honeycomb shape.

Figure 8A:
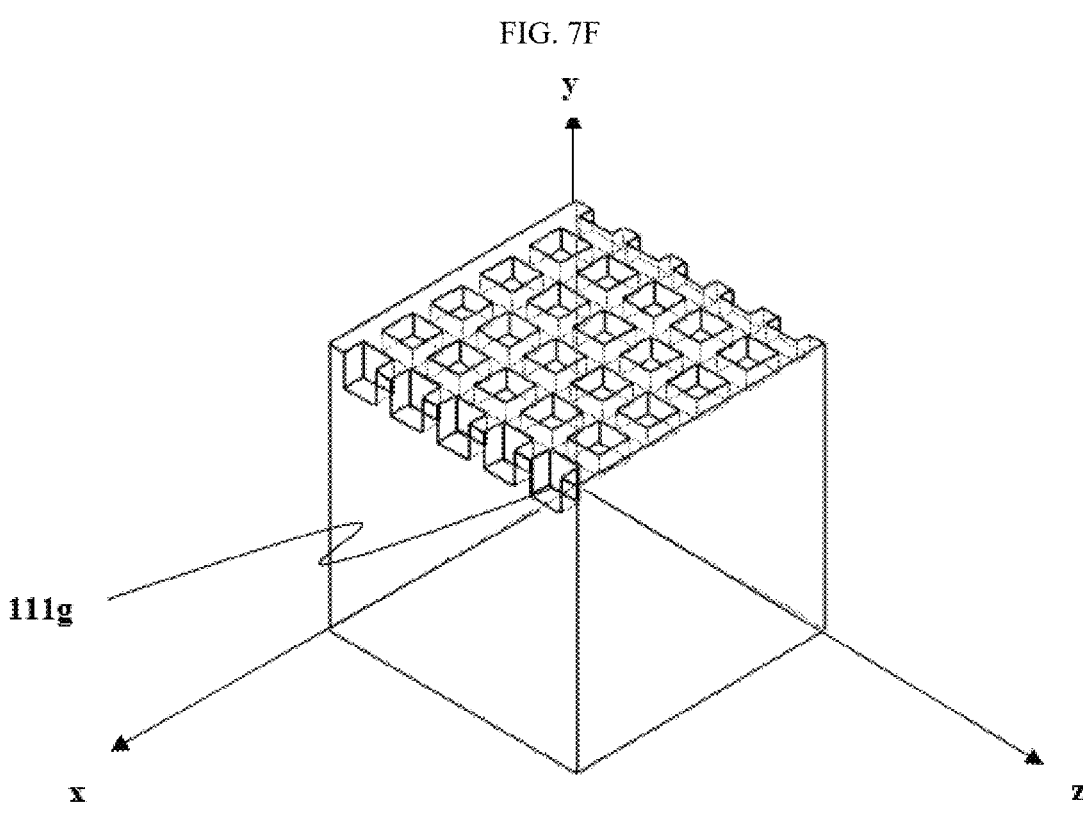
FIG. 8A shows interglobal embodiments of the first textured group of layer(s) provided on the retainer of the present invention.
Figure 8B:
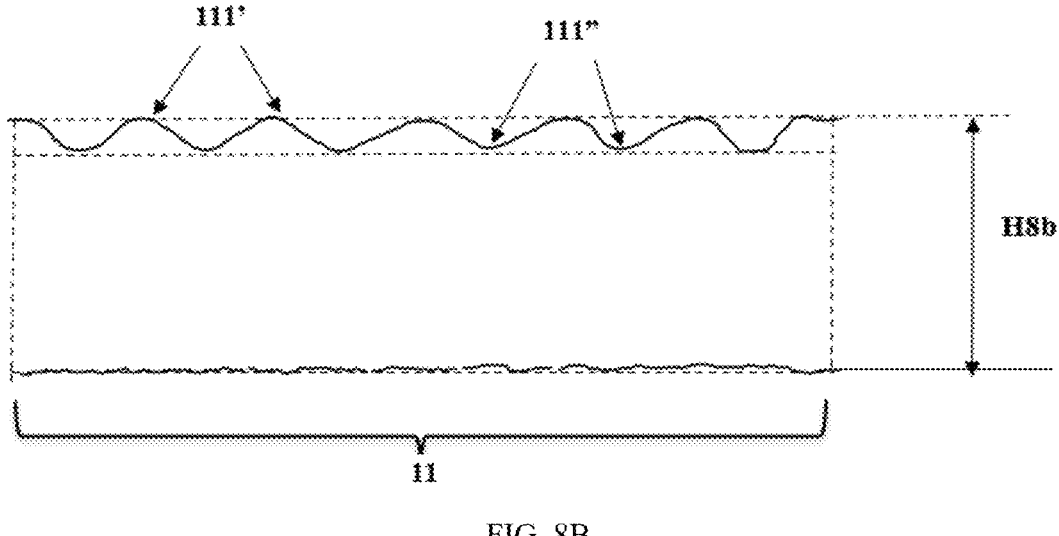
FIG. 8B shows cross-section of a first textured group of layer

As shown in FIG. 8A, the first textured group of layer(s) (11) have dimples or notches or protrusions or peaks or valleys and have a height, depth and width value (111g) which has preferably, between 0.2 mm and 0.05 mm, more preferably between 0.015 mm and 0.001 mm.

Figure 9A:
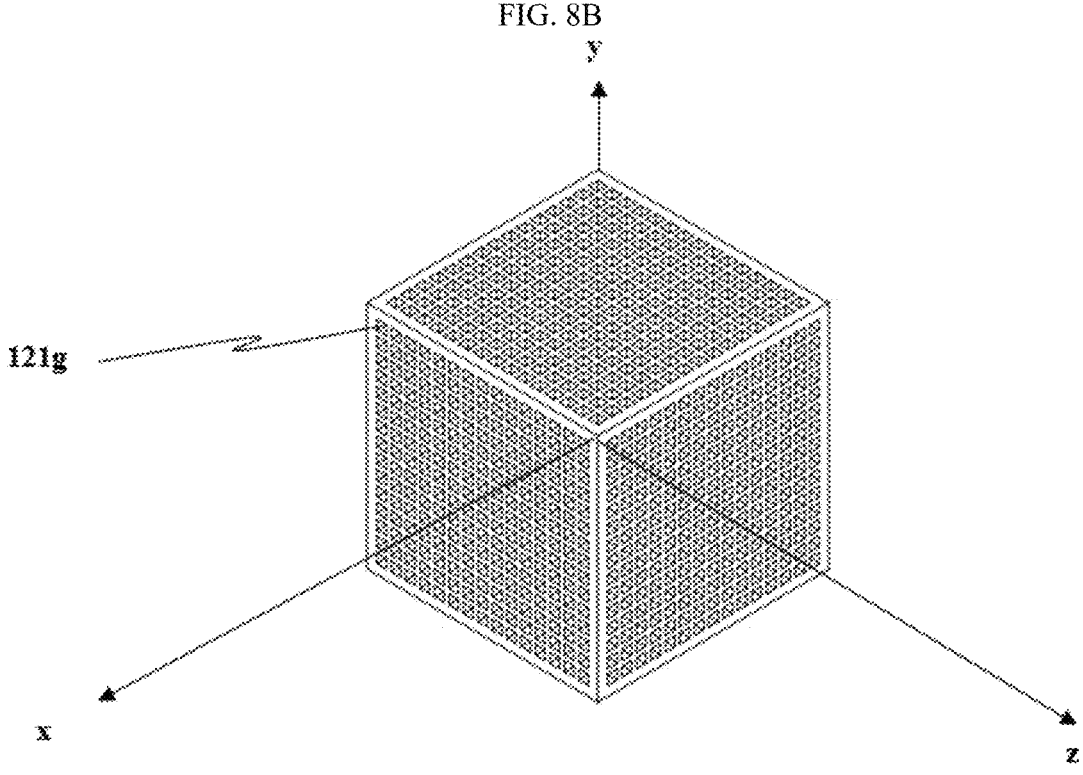
FIG. 9A shows interglobal embodiments of the second textured group of layer(s) provided on the retainer of the present invention.
Figure 9B:
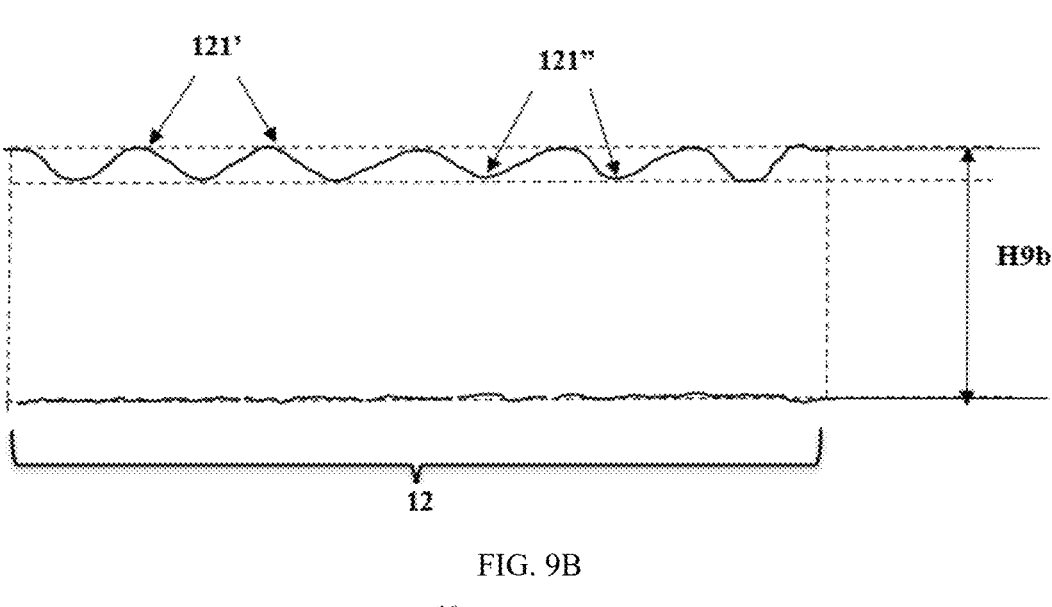
FIG. 9B shows cross-section of a second textured group of layer

As shown in FIG. 9A; The second textured group of layer(s) (12) have dimples or notches or protrusions or peaks or valleys and have a height, depth and width value (121g) which has preferably, between 0.1 mm and 0.01 mm, more preferably between 5 μm and 0.05 μm.

The first textured group of layer(s) (11) and/or the second textured group of layer(s) (12) are treated by laser texturing or electro anodizing or electropolishing or acid treatment.

The first textured group of layer(s) (11) provided on the retainer (1, 1', 1", 1a, 1b, c, 1d, 1e, 1f, 1g) can be formed by using various techniques including but not limited to micro CNC milling, micro CNC engraving, selective laser melting, laser marking, laser etching, sandblasting or any other mechanical or chemical means for providing engraved or embossed surfaces.

A method for producing the orthodontic retainer (1) comprising the steps of providing a metal sheet to form the retainer material in wire shape, cutting the metal sheet by laser, obtaining a first textured group of layer(s) (11) and a second textured group of layer(s) (12) by laser textured, wherein the first textured group of layer(s) (11) and the second textured group of layer(s) (12) are separated from each other with different type of surface roughness parameters.

The method further comprising the steps of:
providing an artificial and perpendicular straight plane on Y axes and said plane is able to manipulate in six degrees of freedom (6DOF) for desired placement of the orthodontic retainer (1) by using computer aided design program
providing a cross-section plane with said artificial plane
providing a complete sketch of the orthodontic retainer (1) by using cross-section plane and providing design of the orthodontic retainer (1) at once and same time.
providing a fixture holder (201) and merging it with the orthodontic retainer (1)
providing a metal sheet to form the retainer material in wire shape and cutting the metal sheet by laser or wire EDM or providing a straight wire and bending it by CNC wire bending machine.

Designing and obtaining a first textured group of layer(s) (11) and a second textured group layer(s) (12) with a fixture holder (201) by computer aided design program and providing desired texture areas by using laser texturing, wherein the first textured group layer(s) (11) and the second textured group of layer(s) (12) are separated from each other with different type of surface roughness parameters.

The method for producing the orthodontic retainer (1) comprising the steps of:

providing a metal sheet to form the retainer material in wire shape, cutting the metal sheet by laser or wire EDM; or providing a straight wire to bend the retainer material by using CNC wire bending machine with a fixture holder (201)

obtaining a first textured group of layer(s) (11) and a second textured group of layer(s) (12) with a fixture holder (201) by laser texturing, wherein the first textured group of layer(s) (11) and the second textured group of layer(s) (12) are separated from each other with different type of surface roughness parameters.

The method for producing the orthodontic retainer (1) further comprising forming the first textured group of layer(s) (11) as hydrophilic surface, superhydrophilic, oleophilic or superolephilic for fixation and the second textured group of layer(s) (12) as hydrophobic, ultrahydrophobic, superhydrophobic, oleophobic or superoleophobic surface located longitudinally between first textured group of layer(s) (11). Six degrees of freedom (6DOF) refers to the freedom of movement of a rigid body in three-dimensional space, such an artificial plane is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis)

The method for producing the orthodontic retainer (1) further comprising wherein the metal sheet is made of nitinol or beta titanium or superelastic alloy or shape memory alloy.

The first textured group of layer(s) (11) are preferably provided with regularly repeating dimples or notches or protrusions with embossing or engraving techniques as shown with various embodiments in FIGS. 7A-7F which eventually create some of the possible patterns. Present invention contains quite distinct surface patterns on micron or nanometer scale. Specially made numeric dimples or notches or protrusions may be generated and placed with different type of depth and width with differently placed density, and they may be continuous or discontinuous with various shapes and geometries with 2d or 3d micro-constructions. Spectrum of such a micron or nanometer scale textured surfaces may be regular, near-regular or irregular. Motif and construction of the surfaces can be designed on computer environment according to desired surface characteristics. Said the first textured group of layer(s) (11) are specially made and designed as geometrical entities by using, for instance, laser texturing methods. The pattern forming dimples or notches or protrusions can be repeating formations in intensely or sparsely distributed circular shape (FIGS. 7A and 7B), rectangular shape (FIG. 7C), zigzag shape (FIG. 7D), triangular shape (FIG. 7E), transversally rectangular shape (FIG. 7F) or honeycomb shape (not shown). As an alternative, regular, near-regular or irregular textures and geometrical entities formed by engraving or embossing can be randomly placed with various dimensions and 2d or 3d micro-constructions.

The direction of the first textured group of layer(s) (11) is important for the patient's comfort as well as the bonding forces with glue. Extreme forces may generate mostly in biting action which will effect the orthodontic retainer and may make debonding problems. These forces will test the adhesiveness behaviour of the orthodontic retainer, mostly in Y axes as shown in FIG. 1, because of this reason, present invention suggest surface modifications and placement of first textured group of layer(s) advantageously on Y axes. Placing the first textured group of layer(s) (11) both on top or on bottom side of the orthodontic retainer, may increase the adhesiveness, while will increase the enamel loss too, mostly in the case of debonding (failure). Furthermore, it is quite preferable that the first textured group of layer(s) (11) wouldn't be in close distance with surfaces of enamel, this is only possible by placement of the first textured group of layer(s), on a top side or on a bottom side of the orthodontic retainer, regarding lower jaw or upper jaw placement of the orthodontic retainer usage.

Therefore, it has been advantageously contemplated that, if losing enamel is not the main focus and said retainer planned to place for a longterm stabilization, first textured group of layer(s) (11) are arranged on the top side (Y) and/or on the bottom side (Y') parallel to longitudinal direction (x) of the retainer (1) and perpendicular to lingual side (z) as shown in FIG. 1. Glue (3) is applied on the retainer (1) surface, particularly to the first textured group of layer(s) (11).

The first textured group of layer(s) (11) are preferably applied locationally along the wire shaped retainer (1) such that second textured group of layer(s) (12) are provided in desired locations between first textured group of layer(s) (11) as shown in FIGS. 3 and 4.

As show in FIG. 4, this type of retainer is designed, in order to manufacture desired surface behaviours and bonding forces according teeth's root. Literally, canines (3rd tooth) have bigger roots than centrals and laterals have the smallest in anterior side. Therefore, bite relation and tooth-tooth's root retaining relation between the teeth will effect differently at each point of the orthodontic retainer (1'), and can be customized according these needs. Such a customization can be ensured longer wearing time of the orthodontic retainer (1'). For example, between canine and lateral area is named "121a". Said area (121a) is configured to be able to resist larger forces then 20 Kpa. Between lateral and central area is named "121d". Said area (121d) is configured to be able to resist larger forces then 15 Kpa. Lastly, between central and central area is named "121e". Said area (121e) is configured to be able to resist larger forces then 25 Kpa.

Preferably, the first textured group of layer(s) (11) are configured to coincide more planar with surfaces of teeth (2') while the second textured group of layer(s) (12) coincide with interdental areas (22). With this configuration, the first textured group of layer(s) (11) which provide more effective fixation are provided in areas more suitable for gluing while the interdental areas (22) become free of glue/composite resin and thus enamel surfaces are protected from abrasion. Moreover, the configuration mentioned above provides cost-effectiveness in production and application.

Figure 10A:
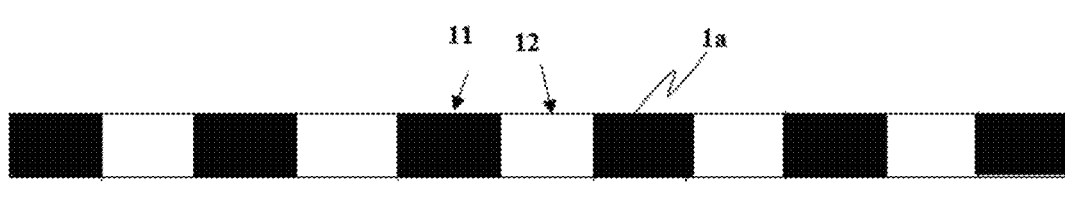
Figure 10B:
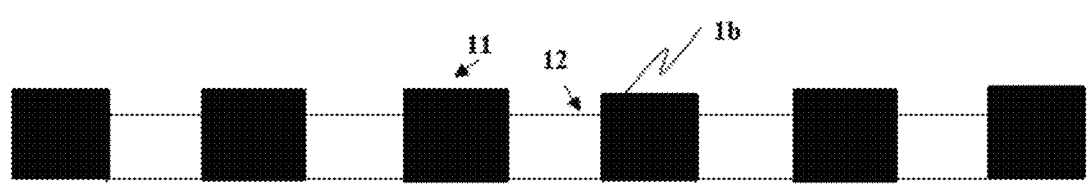
Figure 10C:
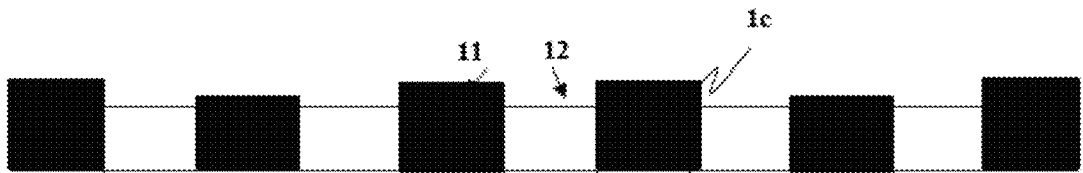
Figure 10D:
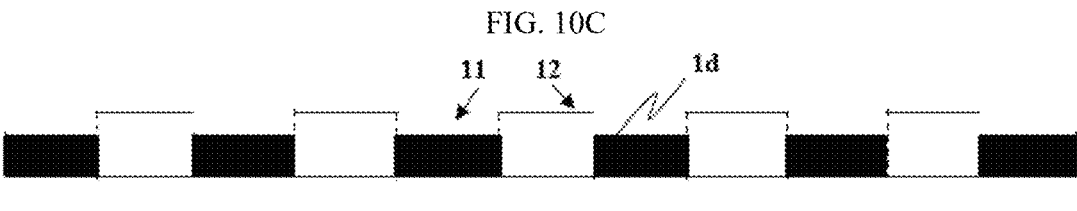
Figure 10E:
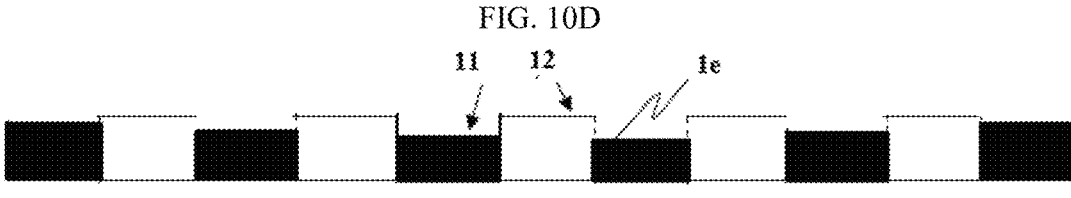
Figure 12A:
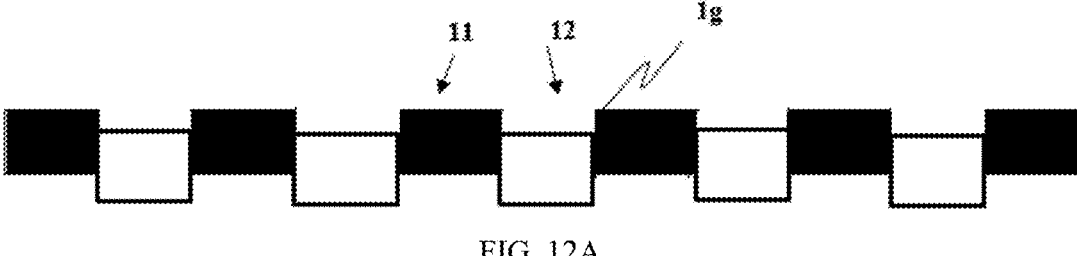
FIGS. 12A-12B show possible alternatives and different embodiments of the first textured and second textured group of layer(s) provided on the retainer of the present invention.

Normally, the wire shaped retainer (1) according to the present invention is provided with a constant width (assumed that texturing depth is not more than 0.01 mm) as shown in FIG. 10A. Nevertheless, there are unlimited type of jaw relations and unlimited type of bite relations between the teeth. It is however possible to adjust the width in such a manner that first textured group of layer(s) (11) would be larger than the second textured group of layer(s) (12) (FIG. 10B) or smaller than the second textured group of layer(s) (12) (FIG. 10D). Alternatively, width of the first textured group of layer(s) (11) and the second textured group of layer(s) (12) can be provided in a varying manner (FIGS. 10C, 10E, and 10F). The dedicated textures can be formed in any geometric shape as exemplied before. As shown in FIG. 12A, wire shaped retainer (1g) according to the present invention is provided with vertically manipulated manner. Such a design can be manufactured by using laser texturing both by embossing and engraving manner. Alternatively, such a design can be gained with bending plier by using heat treatment. For example, such a retainer (la), can be transformed to the new vertically manipulated shape (1g) by heat treatment and bending pliers. This type of placement can be designed, regarding bite relation of the jaws and particular relation of the teeth. Such a placement can prevent early contacts of the teeth and breaking of the orthodontic retainer (1), especially for deep bite, open bite and Class II cases.

Figures 11A, 11B:
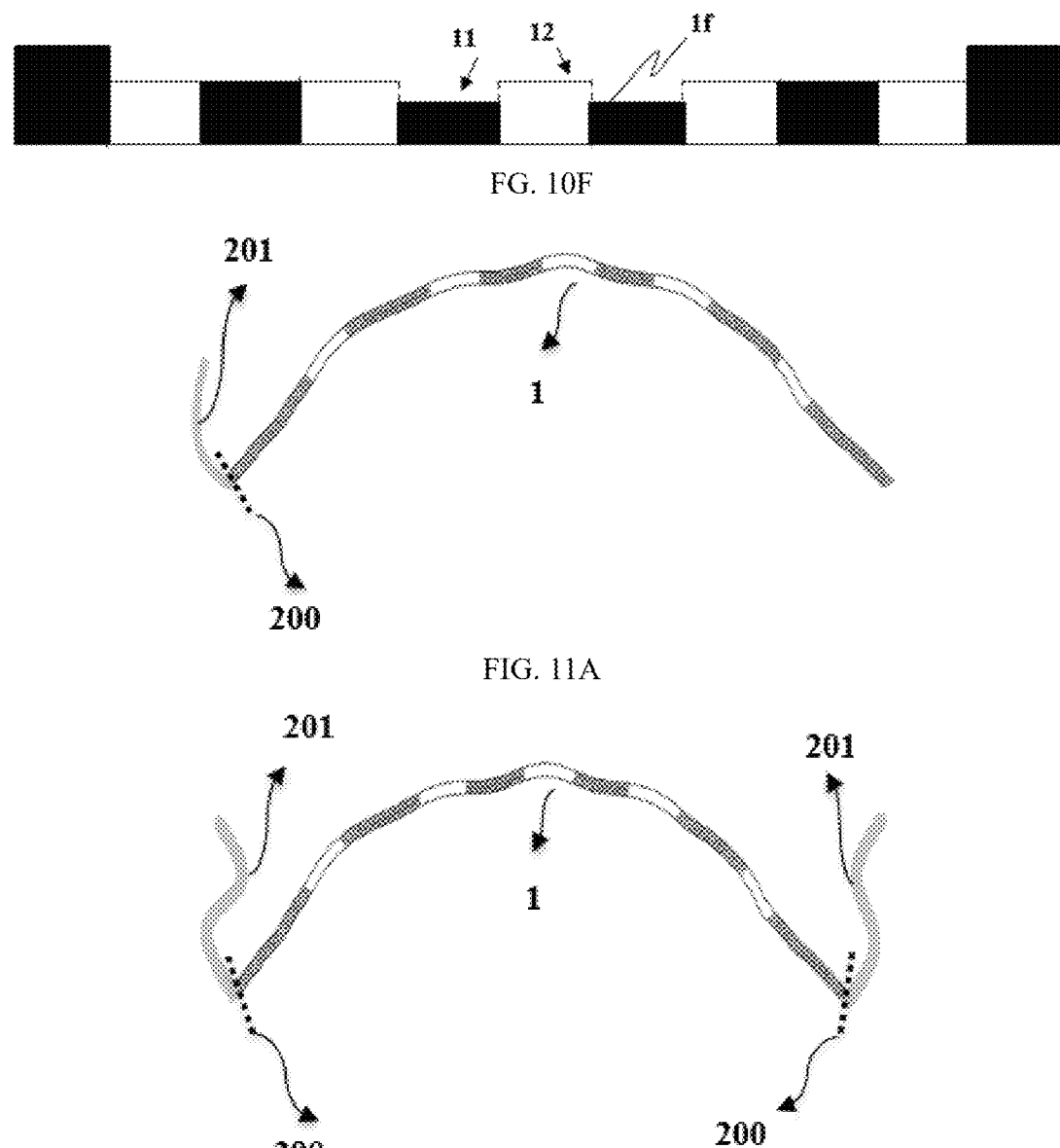
FIGS. 11A-11D show possible alternatives and different embodiments of the orthodontic retainer with cutting line and fixture holder design.
Figure 11C:
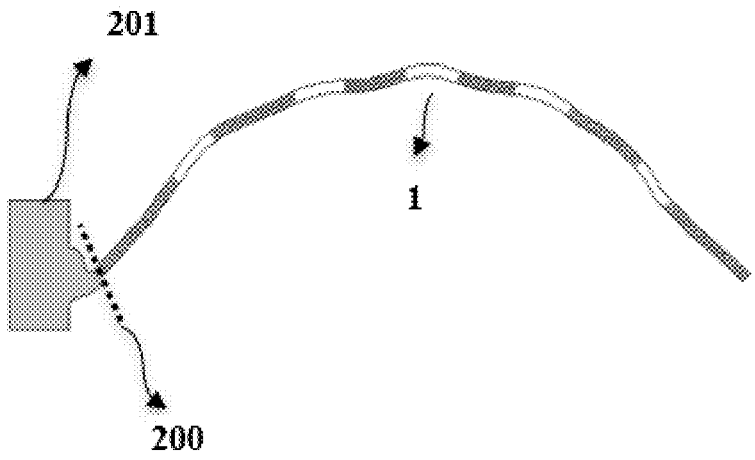
Figure 11D:
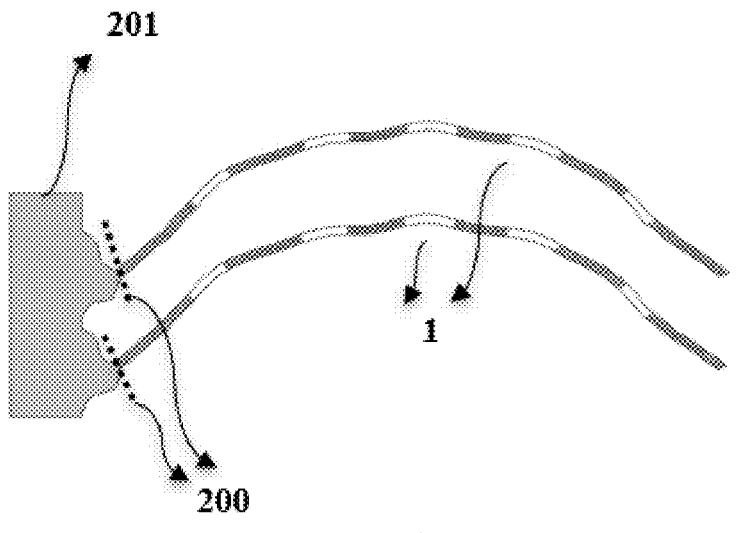

As shown in FIGS. 11A-11D, said orthodontic retainer (1) is manufactured with fixture holder part (201). Such a fixture holder part (201) necessarily should design in workflow, especially before obtaining to the orthodontic retainer (1) and laser texturing method. Said fixture holder part (201) is made easily available to rotate the part and made the texturing accurate. Also, said fixture holder part (201) is necessary for above mentioned workflow of before and after laser texturing. Present invention suggest to use said fixture holder part (201) for each manufactured orthodontic retainer (1). As shown in FIG. 11A and FIG. 11B are available to design and manufacture such a fixture holder part (201) with laser cutting and CNC wire bending. As shown in FIG. 11B, such a fixture holder part (201) with two ends can be used if the orthodontic retainer (1) is longer then 30 mm, in order to made fixing durable. As shown in FIG. 11C, such a fixture holder part (201) can be used only if the manufacturing method will be laser cutting or wire EDM and it's advantageous that order ID can be textured here (in bigger place then FIG. 11A) of said fixture holder part (201), in order to prevent manufacture errors and order errors. As shown in FIG. 11D, such a fixture holder part (201) can be used only if the manufacturing method will be laser cutting or wire EDM and multi amounts of the orthodontic retainer (1) needed to manufacture. Dedicated design (FIG. 11D) prevent material wastage and make available to manufacture all the parts with the same time. Also, the length of the orthodontic retainers are generally between 25-40 mm, and the thickness are between 0.35-0.55 mm, and due dimensions, it's easy to lose manufactured parts in workflow, such a multi type fixture holder (FIG. 11D) advantageously save time and prevent losing the part and losing time in workflow. Such a fixture holder part (201) with two ends can be used, if the orthodontic retainer (1) is longer then 30 mm, in order to made fixing durable. Cutting line (200) is made to determine where fixture holder (201) starts, and where should to be made cut. Cutting plier can be used to cut the material from dedicated cutting line (200), before transferring it to the patient. Such a cutting will cause a sharp edge to occur, and that's why present invention advantageously suggest to use chemical treatment or mechanical wear for cutting line (200), in order to make it smoother before transferring of the orthodontic retainer (1) to patient.

Figure 12B:
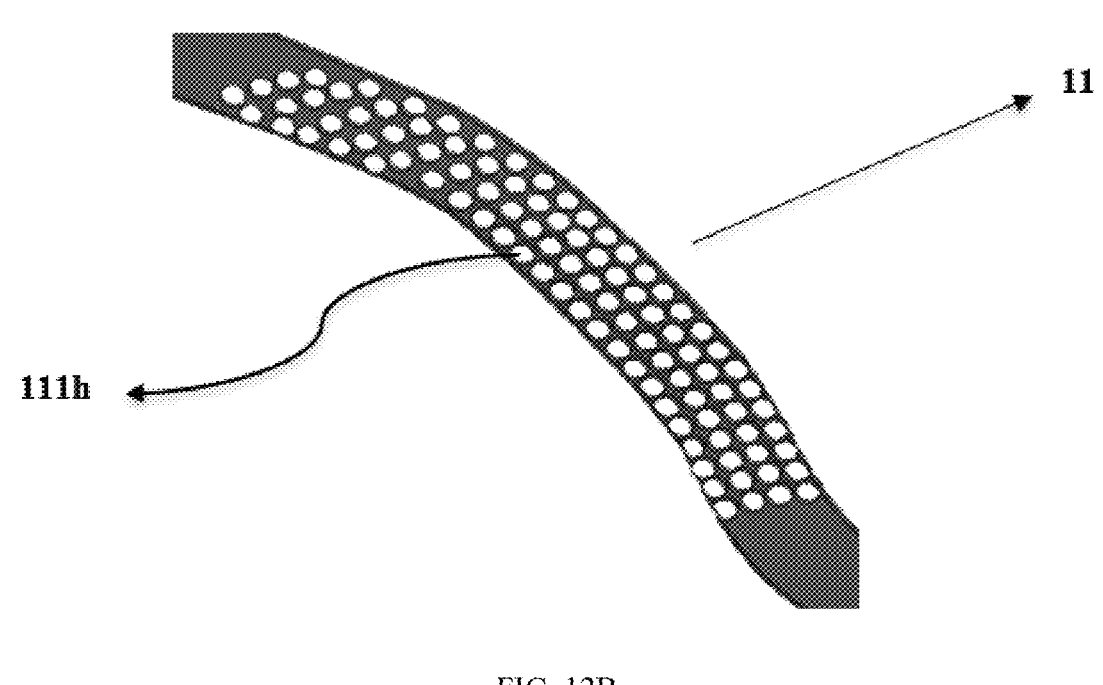

Likewise, as shown in FIG. 12B, such a full length hole (111h) can be used, in order to increase adhesiveness properties of the orthodontic retainer with or without said first textured group of layer(s) (11). Demonstrated figure (FIG. 12B) has frequent amount of holes, but it's not mandatory to has such frequency. The full length hole (111h) dimension can be between 0.05 mm-0.1 mm and with low frequency placement. For example, such a full length hole (111h) with 0.1 mm dimension and just 4 pieces of full length hole (111h), can be made placed longitudinally on the place of first textured group of layer(s) (11). Such a placement of full length hole (111h) can be made with laser or circle-type cutting die by using heat treatment or pressing-stamping machine by using cold treatment (without using heating)

Figure 13A:
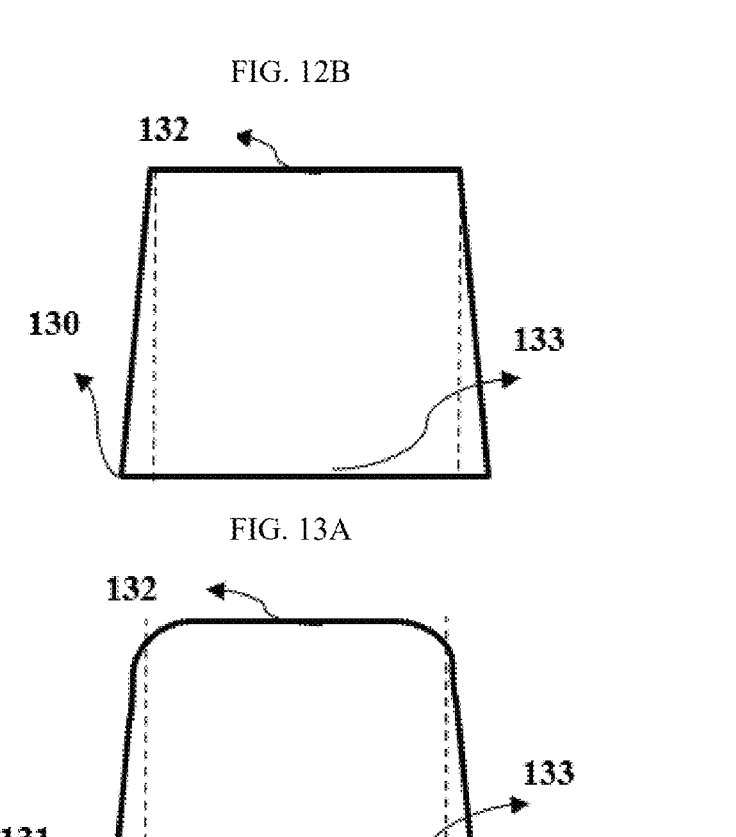
FIGS. 13A-13H show a cross-section of different embodiments of the orthodontic retainer of the present invention.

FIGS. 13A-13H show cross-section of possible alternatives and different embodiments of provided on the retainer of the present invention. As shown in FIG. 13A; such a trapezoidal section can be obtained after laser cutting. There are three definitions in order to explain the reason: Taper angle and Top or Bottom Kerf Width. Main reason of the case is laser nature. Because, the laser burns away a portion of material when it cuts through. This is known as the laser kerf. Shortly, there is no possibility to manufacture any part with "rectangle shape" with laser method. Laser cutting will always produce a cut with a slight taper to it. Likewise, there is no possibility to manufacture any part "parallelogram shape" with laser method, even by using offset parameters, because of the dimension of the orthodontic retainer (1) and machining area. Laser Kerf is determined by material properties and thickness. But other factors also have an impact on how much the laser takes away. Kerf widths can vary even on the same material sheet, whether cutting a straight line or a curve line or from laser cutting in the x or Y dimension. The manufacturing tolerance of the material can also impact the kerf.

Figure 13B:
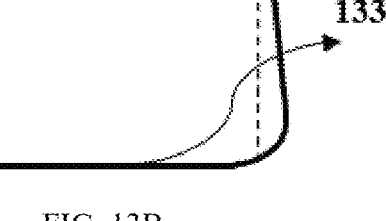
Figures 13C, 13D, 13E:
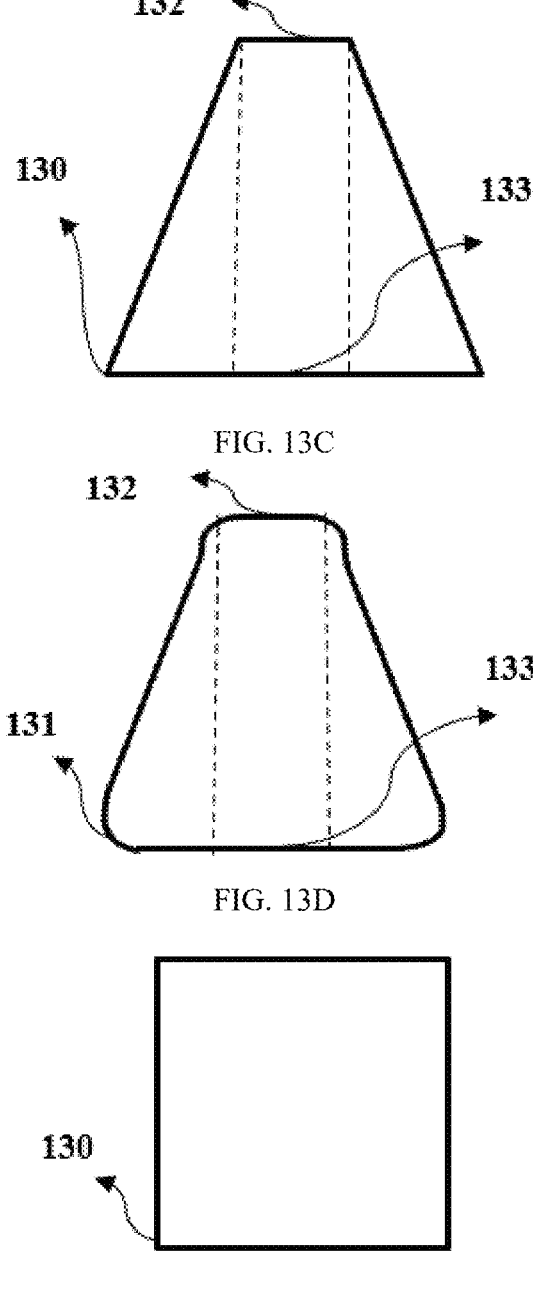
Figures 13F, 13G, 13H:
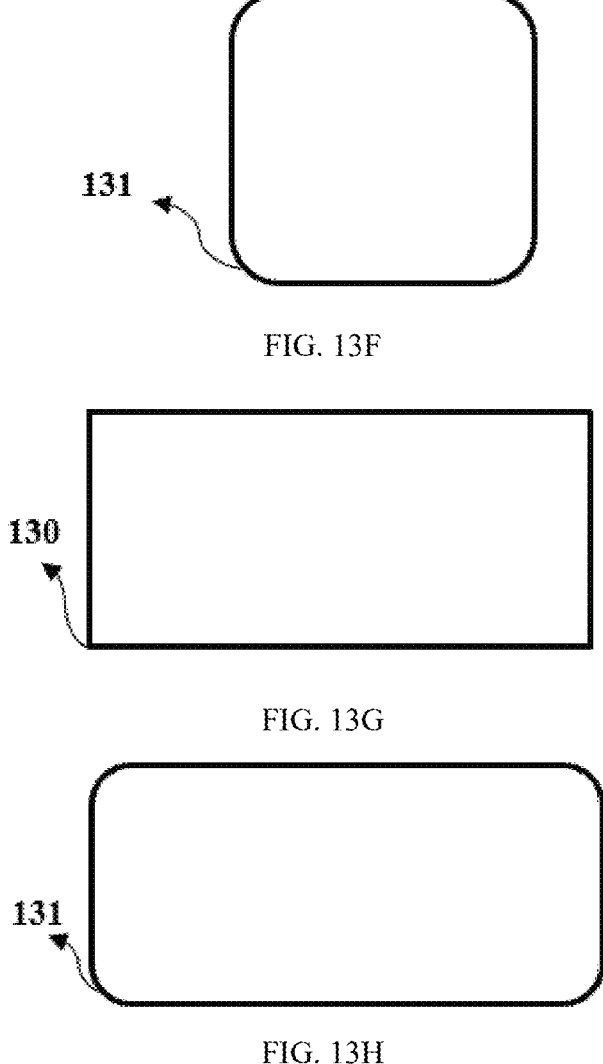

As shown in FIG. 13A; ideally laser cutting retainer, where the top kerf (132) is not aggressively smaller than the bottom kerf (133). However, as shown in FIG. 13C, laser cutting has been done unsuitable and that's why top kerf (132) is aggressively smaller than bottom kerf (133). At the other hand, it's possible to manufacture such a section which is given in FIG. 13E (square) or in FIG. 13G (rectangle) with wire erosion machine (Wire Edm) before laser texturing method and with above mentioned post-treatment methods. Alternatively, such a manufacturing can be obtained with CNC wire bending machine for rectangle and square shape by bending straight wire before laser texturing method and with above mentioned post-treatment methods. As shown in FIG. 13B and FIG. 13D, the present application suggest to use chemical treatment or acid base treatment or electropolishing or anodizing to the material, then section and especially edges (130) of the orthodontic retainer can be obtained smoother edges (131), such an application will transform to the section; from FIG. 13A to FIG. 13B and from FIG. 13C to FIG. 13D. Finally, as shown in FIG. 13E (square shape) and in FIG. 13G (rectangle shape), obtained square or rectangle shape section with wire EDM or wire bending machine, after that, the present application suggest to use chemical treatment or acid base treatment or electropolishing or anodizing to the material, then section and especially edges (130) of the orthodontic retainer can be obtained smoother edges (131), such an application will transform to the section; from FIG. 13E to FIG. 13F and from FIG. 13G to FIG. 13H. This transformation is mandatory before transferring to the orthodontic retainer (1) to the patient, in order to prevent any sharp edges to injuring in the patient mouth.

What is claimed is:
1. An orthodontic retainer for stabilization of a plurality of teeth comprising:

at least one first region having a first surface with a contact angle of between 0° and 90° when measured with water or oil, said at least one first region being located on a top side and/or a bottom side of the orthodontic retainer and/or located on a tooth side and/or on a tongue side of the orthodontic retainer, at least one second region having a second surface with a contact angle greater than 90° when measured with the water or the oil, said at least one second region being located on a top side and/or a bottom side of the orthodontic retainer and/or located on a tooth side and/or on a tongue side of the orthodontic retainer;

wherein the orthodontic retainer is integrally formed in one piece, the at least one first region and the at least one second region have different types of surface roughness parameters from each other, wherein the at least one first region is at least one first textured group of layers for improving adhesiveness of the retainer when contacting with contact surfaces of teeth, and the at least one second region is at least one second textured group of layers for placing on interdental places and is configured to prevent biofilm entities.

2. The orthodontic retainer according to claim 1, wherein the orthodontic retainer is made of nickel-titanium alloy, titanium alloy, beta titanium alloy, gold alloy, silver alloy, a shape memory alloy or a superelastic alloy.

3. The orthodontic retainer according to claim 2, wherein the contact angle of the first surface is between 0° and 10° when measured with the water or the oil, and wherein the contact angle of the second surface is between 90° and 150° when measured with the water or the oil.

4. The orthodontic retainer according to claim 2, wherein the contact angle of the first surface is between 0° and 10° when measured with the water or the oil, and wherein the contact angle of the second surface is between 90° and 150° when measured with the water or the oil, wherein the orthodontic retainer is formed in one piece and consists of a shape memory type or superelastic type-alloy.

5. The orthodontic retainer according to claim 1, wherein the contact angle of the first surface is between 0° and 10° when measured with the water or the oil, and wherein the contact angle of the second surface is between 90° and 150° when measured with the water or the oil.

6. The orthodontic retainer according to claim 1, wherein the contact angle of the first surface is between 0° and 10° when measured with the water or the oil, and wherein the contact angle of the second surface is between 90° and 150° when measured with the water or the oil, wherein the orthodontic retainer consists of a shape memory type or superelastic type alloy.

7. The orthodontic retainer according to claim 1, wherein the at least one first textured group of layers has a surface roughness profile formed by dimples, notches or protrusions, and the surface roughness profile is defined by:

an arithmetical mean roughness value ($R_a$) ranging from 12.5 to 35.0 μm, and a mean roughness depth value ($R_z$) ranging from 50.0 to 200.0 μm.

8. The orthodontic retainer according to claim 1, wherein the at least one second textured group of layers has a surface roughness profile as defined by:

an arithmetical mean roughness value ($R_a$) ranging from 0.012 to 8 μm, and a mean roughness depth value ($R_z$) ranging from 0.40 to 50 μm.

9. The orthodontic retainer according to claim 1, wherein the orthodontic retainer is embeddable in a composite resin, and a perpendicular distance between a closest tooth surface and a closest orthodontic retainer surface on a tooth side is a maximum of 0.10 mm.

10. The orthodontic retainer according to claim 1, wherein the at least one second textured group of layers without composite resin correspond to interdental places, and a perpendicular distance between a closest tooth surface and a closest orthodontic retainer surface on a tooth side is between 0.10 mm-0.40 mm.

11. The orthodontic retainer according to claim 1, wherein the orthodontic retainer has a cross-sectional height, a cross-section in a shape of a quadrilateral, with edge lengths of the cross-section amounting to a maximum of 0.55 mm, and a minimum of 0.35 mm.

12. The orthodontic retainer according to claim 1, wherein the at least one first textured group of layers has a surface roughness profile formed by dimples, notches or protrusions, and wherein the dimples, the notches or the protrusions form a repeating texture having a circular, rectangular, zigzag, triangular, transversally rectangular or honeycomb shape.

13. The orthodontic retainer according to claim 1, wherein the at least one first textured group of layers and/or the at least one second textured group of layers are treated by a laser texturing or electro anodizing or electropolishing or acid treatment.

14. A method for producing the orthodontic retainer according to claim 1, comprising steps of:

providing a metal sheet to form a retainer material in a wire shape, cutting the metal sheet held by a fixture holder with a laser or a wire EDM; or providing a straight wire to bend the retainer material by using a CNC wire bending machine with the fixture holder, obtaining the at least one first textured group of layers and the at least one second textured group of layers with the fixture holder by laser texturing, wherein the at least one first textured group of layers and the at least one second textured group of layers are separated from each other with the different types of surface roughness parameters.

15. The method for producing the orthodontic retainer according to claim 14, further comprising:

forming the at least one first textured group of layers and the at least one second textured group of layers located longitudinally between the at least one first textured group of layers.

16. The method for producing the orthodontic retainer according to claim 14, wherein the metal sheet is made of nitinol or beta titanium or superelastic alloy or shape memory alloy.

17. The orthodontic retainer according to claim 1, wherein the contact angle of the first surface is between 0° and 10° when measured with the water or the oil, and wherein the contact angle of the second surface is between 90° and 150° when measured with the water or the oil, wherein the orthodontic retainer consists of a shape memory type or superelastic type alloy.

* * * * *